(12) United States Patent
Suzuki et al.

(10) Patent No.: US 11,658,282 B2
(45) Date of Patent: May 23, 2023

(54) COMPOSITION FOR FORMING ACTIVE MATERIAL LAYER AND METHOD FOR MANUFACTURING THE SAME, AND METHODS FOR MANUFACTURING ELECTRODE SHEET FOR ALL-SOLID STATE SECONDARY BATTERY AND ALL-SOLID STATE SECONDARY BATTERY

(71) Applicant: FUJIFILM Corporation, Tokyo (JP)

(72) Inventors: Hideyuki Suzuki, Kanagawa (JP); Shin Ozawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 193 days.

(21) Appl. No.: 16/833,668

(22) Filed: Mar. 30, 2020

(65) Prior Publication Data

US 2020/0227726 A1 Jul. 16, 2020

Related U.S. Application Data

(63) Continuation of application No. PCT/JP2018/038263, filed on Oct. 15, 2018.

(30) Foreign Application Priority Data

Oct. 30, 2017 (JP) .............................. JP2017-209603

(51) Int. Cl.
*H01M 4/136* (2010.01)
*H01M 4/1397* (2010.01)
*H01M 4/58* (2010.01)

(52) U.S. Cl.
CPC ......... *H01M 4/136* (2013.01); *H01M 4/1397* (2013.01); *H01M 4/5815* (2013.01)

(58) Field of Classification Search
CPC ......... H01M 4/62–628; H01M 4/1397; H01M 10/0562
See application file for complete search history.

(56) References Cited

U.S. PATENT DOCUMENTS

| 9,236,158 B2 | 1/2016 | Kubo et al. |
| 2017/0214081 A1 | 7/2017 | Tsuno et al. |

(Continued)

FOREIGN PATENT DOCUMENTS

| JP | H01104678 | 4/1989 |
| JP | 2012212652 | 11/2012 |

(Continued)

OTHER PUBLICATIONS

"Search Report of Europe Counterpart Application", dated Nov. 13, 2020, pp. 1-7.

(Continued)

*Primary Examiner* — Stephan J Essex
(74) *Attorney, Agent, or Firm* — JCIPRNET

(57) ABSTRACT

A composition for forming an active material layer, including a sulfide-based solid electrolyte, an active material, a conductive auxiliary agent including a carbonaceous material, and a dispersion medium, in which the dispersion medium includes at least one ketone compound dispersion medium in which two aliphatic groups each having 4 or more carbon atoms are bonded to a carbonyl group; a method for manufacturing the composition for forming an active material layer; a method for manufacturing a solid electrolyte-containing sheet; and a method for manufacturing an all-solid state secondary battery.

15 Claims, 1 Drawing Sheet

(56) References Cited

U.S. PATENT DOCUMENTS

2018/0277891 A1 9/2018 Mimura et al.
2018/0323469 A1* 11/2018 Lim .................. H01M 10/058

FOREIGN PATENT DOCUMENTS

| JP | 2014192061 | | 10/2014 | | |
|---|---|---|---|---|---|
| JP | 2016139511 | | 8/2016 | | |
| JP | 2016139511 | A * | 8/2016 | | |
| JP | 2016212990 | | 12/2016 | | |
| WO | 2014051032 | | 4/2014 | | |
| WO | WO-2014051032 | A1 * | 4/2014 | ........ | H01M 10/0562 |
| WO | 2016013224 | | 1/2016 | | |
| WO | 2016136090 | | 9/2016 | | |
| WO | 2017099248 | | 6/2017 | | |

OTHER PUBLICATIONS

"International Search Report (Form PCT/ISA/210) of PCT/JP2018/038263," dated Jan. 15, 2019, with English translation thereof, pp. 1-5.
"International Preliminary Report on Patentability (Form PCT/IPEA/409) of PCT/JP2018/038263," completed on Oct. 8, 2019, with English translation thereof, pp. 1-18.
"Office Action of China Counterpart Application", dated Sep. 6, 2022, with English translation thereof, p. 1-p. 24.

* cited by examiner

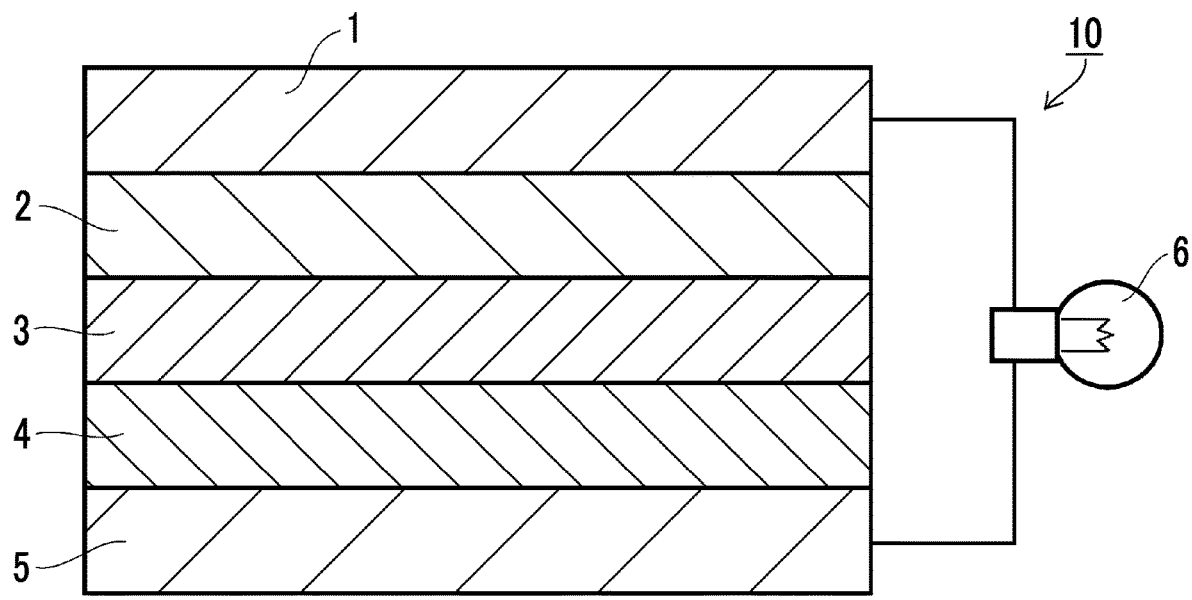

COMPOSITION FOR FORMING ACTIVE MATERIAL LAYER AND METHOD FOR MANUFACTURING THE SAME, AND METHODS FOR MANUFACTURING ELECTRODE SHEET FOR ALL-SOLID STATE SECONDARY BATTERY AND ALL-SOLID STATE SECONDARY BATTERY

CROSS-REFERENCE TO RELATED APPLICATIONS

This application is a Continuation of PCT International Application No. PCT/JP2018/038263 filed on Oct. 15, 2018, which claims priority under 35 U.S.C. § 119 (a) to Japanese Patent Application No. 2017-209603 filed in Japan on Oct. 30, 2017. Each of the above applications is hereby expressly incorporated by reference, in its entirety, into the present application.

BACKGROUND OF THE INVENTION

I. Field of the Invention

The present invention relates to a composition for forming an active material layer and a method for manufacturing the composition for forming an active material layer, and methods for manufacturing an electrode sheet for an all-solid state secondary battery and an all-solid state secondary battery.

2. DESCRIPTION OF THE RELATED ART

A lithium ion secondary battery is a storage battery which has a negative electrode, a positive electrode, and an electrolyte sandwiched between the negative electrode and the positive electrode and enables charging and discharging by the reciprocal migration of lithium ions between both electrodes. In the related art, in lithium ion secondary batteries, an organic electrolytic solution has been used as the electrolyte. However, in organic electrolytic solutions, liquid leakage is likely to occur, there is a concern that a short circuit and ignition may be caused in batteries due to overcharging or overdischarging, and there is a demand for additional improvement in safety and reliability.

Under such circumstances, all-solid state secondary batteries in which a solid electrolyte is used instead of the organic electrolytic solution are attracting attention. In all-solid state secondary batteries, since all of the negative electrode, the electrolyte, and the positive electrode are solid, safety and reliability that are considered as a problem of batteries in which the organic electrolytic solution is used can be significantly improved.

Due to the advantages described above, research and development of an all-solid state secondary battery as a next-generation lithium ion battery is being progressed, and a material forming a constituent layer of the all-solid state secondary battery is also being studied. For example, a composition (slurry) forming a solid electrolyte layer of an all-solid state secondary battery or an electrode active material layer constituting an electrode (a negative electrode and a positive electrode) can be mentioned. The slurry for forming an electrode active material layer is usually a slurry in which a binder, a dispersant, and the like are additionally appropriately dispersed in an inorganic solid electrolyte and an active material that are essential components forming the electrode active material layer using various dispersion media (WO2014/051032A, JP2012-212652A, JP2016-139511A, and JP2016-212990A). Among the inorganic solid electrolytes, a sulfide-based solid electrolyte has received particular attention due to high ion conductivity thereof.

SUMMARY OF THE INVENTION

A composition using a sulfide-based solid electrolyte is obtained by dispersing a sulfide-based solid electrolyte, an active material, and preferably a conductive auxiliary agent in a dispersion medium. In particular, a conductive auxiliary agent is often used in a composition for forming a positive electrode active material layer. In such a composition, a dispersion medium having a low moisture content or a non-aqueous dispersion medium, or a non-polar dispersion medium or a low-polar dispersion medium is generally used among various dispersion media, in order to prevent deterioration of the sulfide-based solid electrolyte exhibiting high reactivity. However, the conductive auxiliary agent usually has a higher hydrophobicity than the sulfide-based solid electrolyte and the active material, and has a dispersion behavior in a dispersion medium different from the sulfide-based solid electrolyte and the active material. Therefore, in the composition containing the conductive auxiliary agent, the sulfide-based solid electrolyte, the active material, and the conductive auxiliary agent each cannot be dispersed with good dispersibility (without aggregation) in the dispersion medium while suppressing the deterioration and decomposition of the sulfide-based solid electrolyte. In the composition, in a case where any one of the sulfide-based solid electrolyte, the active material, and the conductive auxiliary agent does not have sufficient dispersibility, the conductivity of an electrode active material layer to be formed decreases, and an all-solid state secondary battery exhibiting a high battery capacity cannot be obtained. Because a carbonaceous material suitably used as a conductive auxiliary agent tends to aggregate, there is room for improvement in the dispersibility of a composition containing the carbonaceous material as the conductive auxiliary agent.

An object of the present invention is to provide a composition for forming an active material layer and a method for manufacturing the composition for forming an active material layer, with which the manufacture of an all-solid state secondary battery exhibiting a sufficient battery capacity is possible, by using the composition as a material forming an electrode active material layer of an all-solid state secondary battery. In addition, another object of the present invention is to provide a method for manufacturing a solid electrolyte-containing sheet using the composition for forming an active material layer and a method for manufacturing an all-solid state secondary battery.

As a result of various studies, the present inventors have found that a dispersion medium constituted of a ketone compound in which two specific aliphatic groups are bonded to a carbonyl group (hereinafter, also referred to as a ketone compound dispersion medium) can disperse not only a sulfide-based solid electrolyte and an active material but also a carbonaceous material as a conductive auxiliary agent with suppressing the aggregation thereof and without deteriorating the sulfide-based solid electrolyte. Furthermore, the present inventors have found that a composition for forming an active material layer containing the dispersion medium constituted of this ketone compound in combination with a conductive auxiliary agent or the like has a high conductivity when used for an electrode sheet for an all-solid state secondary battery and exhibits a high battery capacity when used for an electrode active material layer of the all-solid state secondary battery. The present invention has been completed by further repeating studies on the basis of the above-described findings.

That is, the above-described problems have been solved by the following means.

<1> A composition for forming an active material layer, the composition comprising a sulfide-based solid electrolyte, an active material, a conductive auxiliary agent including a carbonaceous material, and a dispersion medium, in which the dispersion medium includes at least one ketone compound dispersion medium in which two aliphatic groups each having 4 or more carbon atoms are bonded to a carbonyl group.

<2> The composition for forming an active material layer according to <1>, in which each of the aliphatic groups has a branched chain structure.

<3> The composition for forming an active material layer according to <1> or <2>, in which the dispersion medium includes at least one non-polar dispersion medium.

<4> The composition for forming an active material layer according to <3>, in which the non-polar dispersion medium is a saturated aliphatic hydrocarbon compound dispersion medium.

<5> The composition for forming an active material layer according to any one of <1> to <4>, in which a median diameter of the active material is larger than a median diameter of the sulfide-based solid electrolyte.

<6> A method for manufacturing a composition for forming an active material layer, the method comprising a step of preliminarily dispersing a sulfide-based solid electrolyte in a dispersion medium including at least one ketone compound dispersion medium in which two aliphatic groups each having 4 or more carbon atoms are bonded to a carbonyl group and a step of mixing the obtained preliminary dispersion, an active material, and a conductive auxiliary agent including a carbonaceous material.

<7> The method for manufacturing a composition for forming an active material layer according to <6>, in which each of the aliphatic groups has a branched chain structure.

<8> The method for manufacturing a composition for forming an active material layer according to <6> or <7>, in which the dispersion medium includes at least one non-polar dispersion medium.

<9> The method for manufacturing a composition for forming an active material layer according to <8>, in which the non-polar dispersion medium is a saturated aliphatic hydrocarbon compound dispersion medium.

<10> A method for manufacturing an electrode sheet for an all-solid state secondary battery, the method comprising a step of manufacturing an electrode sheet for an all-solid state secondary battery through the method for manufacturing a composition for forming an active material layer according to any one of <6> to <9>.

<11> A method for manufacturing an all-solid state secondary battery, the method comprising a step of manufacturing an all-solid state secondary battery through the method for manufacturing a composition for forming an active material layer according to any one of <6> to <9>.

The present invention can provide a composition for forming an active material layer and a method for manufacturing the composition for forming an active material layer, with which the manufacture of an all-solid state secondary battery exhibiting a sufficient battery capacity is possible, by using the composition as a material forming an electrode active material layer of an all-solid state secondary battery. Further, the present invention can provide a method for manufacturing a solid electrolyte-containing sheet using the composition for forming an active material layer and a method for manufacturing an all-solid state secondary battery.

The above-described and other characteristics and advantages of the present invention will be further clarified by the following description with appropriate reference to the accompanying drawing.

BRIEF DESCRIPTION OF THE DRAWINGS

FIG. 1 is a vertical cross-sectional view schematically illustrating an all-solid state secondary battery according to a preferred embodiment of the present invention.

DESCRIPTION OF THE PREFERRED EMBODIMENTS

In the description of the present invention, numerical ranges expressed using "to" include numerical values before and after the "to" as the lower limit value and the upper limit value.

(Composition for Forming Active Material Layer)

A composition for forming an active material layer according to the present invention contains a sulfide-based solid electrolyte, an active material, a conductive auxiliary agent including a carbonaceous material (hereinafter, may be simply referred to as a conductive auxiliary agent), and a dispersion medium including at least one ketone compound dispersion medium to be described below. In the composition for forming an active material layer, as will be described later, each of the sulfide-based solid electrolyte, the active material, and the conductive auxiliary agent is in a dispersion state (suspension) dispersed in a dispersion medium in the solid state. The composition for forming an active material layer may be in the above-described dispersed state but is preferably a slurry.

In a case where the composition for forming an active material layer of the present invention has at least one ketone compound dispersion medium in which two aliphatic groups each having 4 or more carbon atoms are bonded to a carbonyl group as a dispersion medium for the sulfide-based solid electrolyte, the active material, and the conductive auxiliary agent, all of the sulfide-based solid electrolyte, the active material, and the conductive auxiliary agent can be dispersed while suppressing the deterioration or decomposition of the sulfide-based solid electrolyte. Although not yet clear, the details of the reason can be considered as follows.

Since the carbonyl group in the ketone compound dispersion medium is a polar group, it can be adsorbed on the surface of the sulfide-based solid electrolyte and the surface of the active material to improve the dispersibility thereof. On the other hand, the ketone compound dispersion medium usually has high reactivity and may react with the sulfide-based solid electrolyte to deteriorate the sulfide-based solid electrolyte. However, since two aliphatic groups each having 4 or more carbon atoms are bonded to the carbonyl group in the ketone compound dispersion medium used in the present invention, it is considered that the aliphatic group (carbon chain) moves freely and thus the reaction between the carbonyl group and the sulfide-based solid electrolyte can be inhibited, and the deterioration can be suppressed while maintaining the adsorption ability to the active material. Further, the ketone compound dispersion medium usually shows dispersibility for the sulfide-based solid electrolyte and the active material, but does not show good dispersibility for the conductive auxiliary agent that is more hydrophobic than the sulfide-based solid electrolyte and the active material. However, in the ketone compound dispersion medium of the present invention, the two aliphatic group moieties described above also exhibit a chemical or physical interaction with the conductive auxiliary agent, and can enhance the dispersibility of the conductive auxiliary agent. This ketone compound dispersion medium can effectively suppress the re-aggregation of a carbonaceous material as the conductive auxiliary agent and can enhance the dispersibility of the carbonaceous material. In a case where the aliphatic group has a branched chain structure, the steric hindrance of the aliphatic group is increased, re-aggregation and the like of the conductive auxiliary agent during preparation of the composition for forming an active material layer of the present invention and during coating and drying are suppressed, and thus the dispersion effect of the conductive auxiliary agent that the ketone compound dispersion medium exerts becomes higher. As described above, in present invention by providing a ketone compound dispersant in which a carbonyl group and the above-described specific aliphatic group are functionally differentiated from each other, and furthermore, each function is exhibited without inhibiting each other, it is possible to disperse the sulfide-based solid electrolyte, the active material, and the conductive auxiliary agent that is more hydrophobic than the sulfide-based solid electrolyte and the active material, while suppressing deterioration or decomposition of the sulfide-based solid electrolyte. As described above, in the composition for forming an active material layer of the present invention, deterioration or decomposition of the sulfide-based solid electrolyte is suppressed, and the sulfide-based solid electrolyte, the active material, and the conductive auxiliary agent are dispersed. Therefore, the composition for forming an active material layer of the present invention can achieve both ion conductivity and electron conductivity at a high level.

The composition for forming an active material layer of the present invention is a non-aqueous composition. In a case where the composition is a non-aqueous composition, deterioration or decomposition of the sulfide-based solid electrolyte can be suppressed, and thus high ion conductivity can be maintained. In the present invention, the non-aqueous composition includes, in addition to an aspect containing no water, a configuration having a moisture content (also referred to as moisture content ratio) of 50 ppm or less. In the non-aqueous composition, the moisture content is preferably 20 ppm or less, more preferably 10 ppm or less, and still more preferably 5 ppm or less. The water content indicates the amount of water (mass proportion to the composition for forming an active material layer) contained in the composition for forming an active material layer. The water content can be determined by filtering the composition for forming an active material layer through a 0.02 μm membrane filer and by performing a Karl Fischer titration.

Hereinafter, components that the composition for forming an active material layer of the embodiment of the present invention contains and may contain will be described.

<Sulfide-Based Solid Electrolyte>

In the present invention, a sulfide-based solid electrolyte is an inorganic sulfide-based solid electrolyte, and the solid electrolyte refers to a solid-form electrolyte capable of migrating ions therein. The inorganic solid electrolyte is clearly differentiated from organic solid electrolytes (polymer electrolytes represented by polyethylene oxide (PEO) or the like and organic electrolyte salts represented by lithium bis(trifluoromethanesulfonyl)imide (LiTFSI)) since the inorganic solid electrolyte does not include any organic substances as a principal ion-conductive material. In addition, the sulfide-based solid electrolyte is a solid in a static state and thus, generally, is not disassociated or liberated into cations and anions. Due to this fact, the inorganic solid electrolyte is also clearly differentiated from inorganic electrolyte salts of which cations and anions are disassociated or liberated in electrolytic solutions or polymers ($LiPF_6$, $LiBF_4$, LiFSI, LiCl, and the like). The sulfide-based solid electrolyte is not particularly limited as long as the inorganic solid electrolyte has the conductivity of ions of metals belonging to Group I or II of the periodic table and is generally a substance not having electron conductivity.

In the present invention, as the sulfide-based solid electrolyte, it is possible to appropriately select and use sulfide-based solid electrolyte materials that are applied to this kind of product.

In a case where an all-solid state lithium ion secondary battery is manufactured using the composition for forming an active material layer according to the embodiment of the present invention, a sulfide-based solid electrolyte having ion conductivity for a lithium ion is used.

Sulfide-based solid electrolytes are preferably compounds which contain sulfur atoms (S), have ion conductivity of metals belonging to Group I or II of the periodic table, and further have electron-insulating properties. The sulfide-based solid electrolytes are preferably inorganic solid electrolytes which, as elements, contain at least Li, S, and P and have a lithium ion conductivity, but the sulfide-based solid electrolytes may also include elements other than Li, S, and P depending on the purposes or cases.

As the sulfide-based solid electrolyte, for example, lithium ion-conductive sulfide-based solid electrolytes satisfying a composition represented by Formula (1) are exemplified.

$$L_{a1}M_{b1}P_{c1}S_{d1}A_{e1} \qquad \text{Formula (1)}$$

In the formula, L represents an element selected from Li, Na, and K and is preferably Li. M represents an element selected from B, Zn, Sn, Si, Cu, Ga, Sb, Al, and Ge. A represents an element selected from I, Br, Cl, and F. a1 to e1 represent the compositional ratios among the individual elements, and a1:b1:c1:d1:e1 satisfies 1 to 12:0 to 5:1:2 to 12:0 to 10. a1 is preferably 1 to 9 and more preferably 1.5 to 7.5. b1 is preferably 0 to 3 and more preferably 0 to 1. d1 is preferably 2.5 to 10 and more preferably 3.0 to 8.5. e1 is preferably 0 to 5 and more preferably 0 to 3.

The compositional ratios among the individual elements can be controlled by adjusting the ratios of raw material compounds blended to manufacture the sulfide-based solid electrolyte as described below.

The sulfide-based solid electrolytes may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based solid electrolytes can be manufactured by a reaction of at least two raw materials of, for example, lithium sulfide ($Li_2S$), phosphorus sulfide (for example, diphosphorus pentasulfide ($P_2S_5$)), a phosphorus single body, a sulfur single body, sodium sulfide, hydrogen sulfide, lithium halides (for example, LiI, LiBr, and LiCl), or sulfides of an element represented by M (for example, $SiS_2$, SnS, and $GeS_2$).

The ratio between $Li_2S$ and $P_2S_5$ in Li—P—S-based glass and Li—P—S-based glass ceramic is preferably 60:40 to 90:10 and more preferably 68:32 to 78:22 in terms of the molar ratio between $Li_2S:P_2S_5$. In a case where the ratio between $Li_2S$ and $P_2S_5$ is set in the above-described range, it is possible to increase the lithium ion conductivity. Specifically, the lithium ion conductivity can be preferably set to $1\times10^{-4}$ S/cm or more and more preferably set to $1\times10^{-3}$ S/cm or more. The upper limit is not particularly limited but realistically $1\times10^{-1}$ S/cm or less.

As specific examples of the sulfide-based solid electrolytes, combination examples of raw materials will be described below. Examples thereof include $Li_2S$—$P_2S_5$, $Li_2S$—$P_2S_5$—$LiCl$, $Li_2S$—$P_2S_5$—$H_2S$, $Li_2S$—$P_2S_5$—$H_2S$—$LiCl$, $Li_2S$—$LiI$—$P_2S_5$, $Li_2S$—$LiI$—$Li_2O$—$P_2S_5$, $Li_2S$—$LiBr$—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—$LiCl$, $Li_2S$—$P_2S_5$—$SnS$, $Li_2S$—$P_2S_5$—$Al_2S_3$, $Li_2S$—$GeS_2$, $Li_2S$—$GeS_2$—$ZnS$, $Li_2S$—$Ga_2S_3$, $Li_2S$—$GeS_2$—$Ga_2S_3$, $Li_2S$—$GeS_2$—$P_2S_5$, $Li_2S$—$Ge_s2$-$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$Si_s2$-$P_2S_5$—$LiI$, $Li_2S$—$SiS_2$—$Li_4SiO_4$, $Li_2S$—$SiS_2$—$Li_3PO_4$, $Li_{10}GeP_2S_{12}$, and the like. Mixing ratios of the individual raw materials do not matter. Examples of a method for synthesizing sulfide-based solid electrolyte materials using the above-described raw material compositions include an amorphization method. Examples of the amorphization methods include a mechanical milling method, a solution method, and a melting quenching method. This is because treatments at a normal temperature become possible, and it is possible to simplify manufacturing steps.

The sulfide-based solid electrolyte is preferably a particle. In this case, the median diameter D50 of the sulfide-based solid electrolyte is not particularly limited but is preferably smaller than the median diameter of the active material described later. The median diameter is, for example, preferably 0.01 μm or more, and more preferably 0.1 μm or more. The upper limit is preferably 100 μm or less and more preferably 5 μm or less. In the present invention, since a specific dispersion medium described later is used, re-aggregation of the sulfide-based solid electrolyte or the like in the composition for forming an active material layer can be suppressed. Therefore, the particle diameter of the sulfide-based solid electrolyte can be reduced. In particular, in a case where the particle diameter is smaller than that of the active material, the battery capacity of the all-solid state secondary battery can be improved. In this case, the upper limit of the particle diameter (median diameter) of the sulfide-based solid electrolyte can be, for example, 100 μm, regardless of the upper limit described above. In a case where preliminary dispersion described later is performed, the diameter can be set to a smaller diameter of 1 μm or less.

The average particle diameter of the sulfide-based solid electrolyte particles is measured in the following order. The sulfide-based solid electrolyte particles are diluted and prepared to 1% by mass of a dispersion liquid using heptane in a 20 mL sample bottle. The diluted dispersion specimen is irradiated with 1 kHz ultrasonic waves for 10 minutes and is then immediately used for testing. Data capturing is carried out 50 times using this dispersion liquid specimen, a laser diffraction/scattering-type particle size distribution measurement instrument LA-920 (trade name, manufactured by Horiba Ltd.), and a silica cell for measurement at a temperature of 25° C., thereby obtaining the volume-average particle diameter. Regarding other detailed conditions and the like, the description of JIS Z8828:2013 "Particle size analysis—Dynamic light scattering method" is referred to as necessary. Five specimens are manufactured and measured per level, and the average values thereof are employed.

The sulfide-based solid electrolytes may be used singly or two or more inorganic solid electrolytes may be used in combination.

The content of the sulfide-based solid electrolyte in the composition for forming an active material layer is not particularly limited and preferably 5% by mass or more, more preferably 10% by mass or more, still more preferably 15% by mass or more, even still more preferably 50% by mass or more, still further preferably 70% by mass or more, and most preferably 90% by mass or more with respect to 100% by mass of the solid components in a case where a decrease in the interface resistance and the maintenance of the decreased interface resistance in the case of being used in the all-solid state secondary battery are taken into account. In a case where the content of the solid electrolyte increases, the ratio of the active material in the electrode decreases, and thus the energy of the battery decreases. Therefore, the upper limit is preferably 50% by mass or less, more preferably 40% by mass or less, and particularly preferably 30% by mass or less.

The content of the sulfide-based solid electrolyte in the composition for forming an active material layer is preferably 5% by mass or more, more preferably 10% by mass or more, and particularly preferably 15% by mass or more as a total content with an active material described later with respect to 100% by mass of the solid components. The upper limit is preferably 99.9% by mass or less, more preferably 99.5% by mass or less, and particularly preferably 99% by mass or less. The content of the sulfide-based solid electrolyte alone is not particularly limited as long as the total content of the sulfide-based solid electrolyte and the active material is within the above range, and is appropriately set.

In the present invention, the solid content (solid component) refers to a component that does not volatilize or evaporate and disappear in the case of carrying out a drying treatment on the composition for forming an active material layer at an atmospheric pressure of 1 mmHg and in a nitrogen atmosphere at 150° C. for six hours. Typically, the solid content refers to a component other than a dispersion medium described below.

<Active Material>

The composition for forming an active material layer of the present invention contains an active material. The active material is a material capable of intercalating and deintercalating ions of a metal element belonging to Group I or Group II of the periodic table. Examples of such active materials include a positive electrode active material and a negative electrode active material. The positive electrode active material is preferably a metallic oxide (preferably a transition metal oxide), the negative electrode active material is preferably a carbonaceous material, a metallic oxide, or a metal capable of forming an alloy with lithium such as Sn, Si, Al, and In.

In the present invention, the composition for forming an active material layer containing a positive electrode active material may be referred to as a composition for a positive electrode, and the composition for forming an active material layer containing a negative electrode active material may be referred to as a composition for a negative electrode.

(Positive Electrode Active Material)

The positive electrode active material is preferably a positive electrode active material capable of reversibly intercalating and deintercalating lithium ions. The above-described material is not particularly limited as long as the material has the above-described characteristics and may be a transition metal oxide, an organic substance, an element capable of being complexed with Li such as sulfur, a complex of sulfur and a metal, or the like.

Among these, as the positive electrode active material, transition metal oxides are preferably used, and transition metal oxides having a transition metal element $M^a$ (one or more elements selected from Co, Ni, Fe, Mn, Cu, and V) are more preferred. In addition, an element $M^b$ (an element of Group I (Ia) of the metal periodic table other than lithium, an element of Group II (IIa), or an element such as Al, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element $M^a$. The positive electrode active material is more preferably synthesized by mixing the element into the transition metal oxide so that the molar ratio of Li/$M^a$ reaches 0.3 to 2.2.

Specific examples of the transition metal oxides include transition metal oxides having a bedded salt-type structure (MA), transition metal oxides having a spinel-type structure (MB), lithium-containing transition metal phosphoric acid compounds (MC), lithium-containing transition metal halogenated phosphoric acid compounds (MD), lithium-containing transition metal silicate compounds (ME), and the like.

Specific examples of the transition metal oxides having a bedded salt-type structure (MA) include $LiCoO_2$ (lithium cobalt oxide [LCO]), $LiNi_2O_2$ (lithium nickelate), $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickelate).

Specific examples of the transition metal oxides having a spinel-type structure (MB) include $LiMn_2O_4$ (LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphoric acid compounds (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and monoclinic an NASICON-type vanadium phosphate salt such as $Li_3V_2(PO_4)_3$ (lithium vanadium phosphate).

Examples of the lithium-containing transition metal halogenated phosphoric acid compounds (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, $Li_2CoSiO_4$, and the like.

In the present invention, the transition metal oxide having a bedded salt-type structure (MA) is preferred, and LCO or NMC is more preferred.

The shape of the positive electrode active material is not particularly limited but is preferably a particle shape. In this case, the median diameter D50 of the positive electrode active material is not particularly limited but is preferably larger than the median diameter of the sulfide-based solid electrolyte in terms of the electric capacity of the all-solid state secondary battery. For example, the median diameter of the positive electrode active material can be set 0.1 to 50 µm. In order to provide a predetermined particle diameter to the positive electrode active material, an ordinary crusher or classifier may be used. A positive electrode active material obtained using a firing method may be used after being washed with water, an acidic aqueous solution, an alkaline aqueous solution, or an organic solvent. The median diameter of the positive electrode active material can be measured in the same manner as the median diameter of the sulfide-based solid electrolyte.

The positive electrode active material may be used singly or two or more positive electrode active materials may be used in combination.

In the case of forming a positive electrode active material layer, the mass (mg) of the positive electrode active material per unit area ($cm^2$) in the positive electrode active material layer (weight per unit area) is not particularly limited. The weight per unit area can be appropriately determined depending on a set battery capacity.

The content of the positive electrode active material in the composition for forming an active material layer is not particularly limited but is preferably 10% to 95% by mass, more preferably 30% to 90% by mass, still more preferably 50% to 85% by mass, and particularly preferably 55% to 80% by mass with respect to a solid content of 100% by mass.

(Negative Electrode Active Material)

The negative electrode active material is preferably a negative electrode active material capable of reversibly intercalating and deintercalating lithium ions. The above-described material is not particularly limited as long as the material has the above-described characteristics, and examples thereof include a carbonaceous material, a metal oxide such as tin oxide, silicon oxide, a metal complex oxide, a lithium single body, a lithium alloy such as a lithium aluminum alloy, metals capable of forming alloys with lithium such as Sn, Si, Al, and In, and the like. Among these, a carbonaceous material or a lithium complex oxide is preferably used in terms of reliability. In addition, the metal complex oxide is preferably capable of intercalating and deintercalating lithium. The materials are not particularly limited but preferably contain titanium and/or lithium as constituent components from the viewpoint of high-current density charging and discharging characteristics.

The carbonaceous material that is used as the negative electrode active material is a material substantially consisting of carbon. Examples thereof include graphite (natural graphite, artificial graphite such as highly oriented pyrolytic graphite), and a carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and active carbon fibers, mesophase microspheres, graphite whisker, flat graphite, and the like.

The metal oxides and the metal complex oxides applied as the negative electrode active material are particularly preferably amorphous oxides, and furthermore, chalcogenides which are reaction products between a metal element and an element belonging to Group XVI of the periodic table are also preferably used. The amorphous oxides mentioned herein refer to oxides having a broad scattering band having a peak of a $2\theta$ value in a range of 20° to 40° in an X-ray diffraction method in which CuKα rays are used and may have crystalline diffraction lines.

In a compound group consisting of the amorphous oxides and the chalcogenides, amorphous oxides of semimetal elements and chalcogenides are more preferred, and elements belonging to Groups XIII (IIIB) to XV (VB) of the periodic table, oxides consisting of one element or a combination of two or more elements of Al, Ga, Si, Sn, Ge, Pb, Sb, and Bi, and chalcogenides are particularly preferred.

Specific examples of preferred amorphous oxides and chalcogenides include $Ga_2O_3$, $SiO$, $GeO$, $SnO$, $SnO_2$, $PbO$, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Bi_2O_4$, $SnSiO_3$, $GeS$, $SnS$, $SnS_2$, $PbS$, $PbS_2$, $Sb_2S_3$, $Sb_2S_5$, and $SnSiS_3$. In addition, these amorphous oxides may be complex oxides with lithium oxide, for example, $Li_2SnO_2$.

The negative electrode active material preferably contains a titanium atom. More specifically, $Li_4Ti_5O_{12}$ (lithium titanium oxide [LTO]) is preferred since the volume fluctuation during the absorption and deintercalation of lithium ions is small, and thus the high-speed charging and discharging characteristics are excellent, and the deterioration of electrodes is suppressed, whereby it becomes possible to improve the service lives of lithium ion secondary batteries.

In the present invention, a Si-based negative electrode is also preferably applied. Generally, a Si negative electrode is capable of intercalating a larger number of Li ions than a carbon negative electrode (graphite, acetylene black, or the like). That is, the amount of Li ions intercalated per unit mass increases. Therefore, it is possible to increase the battery capacity. As a result, there is an advantage that the battery driving duration can be extended.

The shape of the negative electrode active material is not particularly limited but is preferably a particle shape. The median diameter D50 of the negative electrode active material is not particularly limited but is preferably larger than the median diameter of the sulfide-based solid electrolyte described above. For example, the median diameter of the negative electrode active material is preferably 0.1 to 60 μm. In order to provide a predetermined particle diameter, an ordinary crusher or classifier is used. For example, a mortar, a ball mill, a sand mill, an oscillatory ball mill, a satellite ball mill, a planetary ball mill, a revolving airflow-type jet mill, a sieve, or the like is preferably used. During crushing, it is also possible to carry out wet-type crushing in which water or an organic solvent such as methanol is made to coexist. In order to provide a desired particle diameter, classification is preferably carried out. The classification method is not particularly limited, and it is also possible to use a sieve, a wind power classifier, or the like. Both of dry-type classification and wet-type classification can be carried out. The median diameter of the negative electrode active material can be measured in the same manner as the median diameter of the sulfide-based solid electrolyte.

The chemical formulae of the compounds obtained using a firing method can be calculated using an inductively coupled plasma (ICP) emission spectroscopic analysis method as a measurement method from the mass difference of powder before and after firing as a convenient method.

The negative electrode active material may be used singly or two or more negative electrode active materials may be used in combination.

In the case of forming a negative electrode active material layer, the mass (mg) of the negative electrode active material per unit area ($cm^2$) in the negative electrode active material layer (weight per unit area) is not particularly limited. The weight per unit area can be appropriately determined depending on a set battery capacity.

The content of the negative electrode active material in the composition for forming an active material layer is not particularly limited but is preferably 10% to 80% by mass and more preferably 20% to 80% by mass with respect to a solid content of 100% by mass.

(Coating of Active Material)

The surfaces of the positive electrode active material and the negative electrode active material may be coated with different metal oxides. Examples of the surface coating agents include a metal oxide and the like containing Ti, Nb, Ta, W, Zr, Al, Si, or Li. Specific examples thereof include titanium oxide spinel, tantalum-based oxides, niobium-based oxides, lithium niobate-based compounds, and the like, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, $Al_2O_3$, $B_2O_3$, and the like.

In addition, a surface treatment may be carried out on the surfaces of electrodes including the positive electrode active material or the negative electrode active material using sulfur, phosphorous, or the like.

Furthermore, the particle surface of the positive electrode active material or the negative electrode active material may be treated with an active light ray or an active gas (plasma or the like) before or after the coating of the surfaces.

<Conductive Auxiliary Agent>

The composition for forming an active material layer of the present invention contains a conductive auxiliary agent. The conductive auxiliary agent contains a carbonaceous material (which means a conductive auxiliary agent of a carbonaceous material and also referred to as a carbon-based conductive auxiliary agent).

In the present invention, "the conductive auxiliary agent containing a carbonaceous material" and "the conductive auxiliary agent contains a carbonaceous material" mean that at least one of the conductive auxiliary agents used in the composition for forming an active material layer of the present invention is the carbon-based conductive auxiliary agent. The present invention includes an aspect in which a conductive auxiliary agent other than the carbon-based conductive auxiliary agent is included.

In the composition for forming an active material layer according to the embodiment of the present invention, in a case where the conductive auxiliary agent contains a carbon-based conductive auxiliary agent and a conductive auxiliary agent other than the carbon-based conductive auxiliary agent, the configuration of each conductive auxiliary agent is not particularly limited. For example, a carbon-based conductive auxiliary agent and a conductive auxiliary agent other than the carbon-based conductive auxiliary agent may be contained as an aggregate, or a carbon-based conductive auxiliary agent and a conductive auxiliary agent other than the carbon-based conductive auxiliary agent each may be independently contained without forming an aggregate of the carbon-based conductive auxiliary agent and the conductive auxiliary agent other than the carbon-based conductive auxiliary agent. The configuration of the above-described content of each conductive auxiliary agent is the same for an electrode sheet for an all-solid state secondary battery and an active material layer of an all-solid state secondary battery, which will be described later.

In the present invention, in a case where the active material and the conductive auxiliary agent are jointly used, among the above-described conductive auxiliary agents, a conductive auxiliary agent that does not intercalate and deintercalate Li and does not function as an active material at the time of charging and discharging a battery is regarded as the conductive auxiliary agent. Therefore, among the conductive auxiliary agents, a conductive auxiliary agent capable of functioning as the active material in the active material layer at the time of charging and discharging a battery is classified not into the conductive auxiliary agent but into the active material. Whether or not the conductive auxiliary agent functions as the active material at the time of charging and discharging a battery is not unambiguously determined but is determined by the combination with the active material.

The carbon-based conductive auxiliary agent used in the present invention is not particularly limited as long as it is a conductive auxiliary agent of a carbonaceous material, and those known as a general conductive auxiliary agent can be used. Examples of the carbon-based conductive auxiliary agents include individual conductive auxiliary agents, for example, an electron-conductive material, natural graphite, graphite such as artificial graphite, acetylene black, Ketjen black, carbon black such as furnace black, amorphous carbon such as needle coke, carbon fibers such as vapor-grown carbon fibers and carbon nanotubes, and carbon isotopes (excluding carbon fibers) such as graphene and fullerene.

The conductive auxiliary agent is preferably an electron-conductive material, more preferably carbon black, carbon fiber or a carbon isotope, and further preferably carbon black.

The conductive auxiliary agent other than the carbon-based conductive auxiliary agent is not particularly limited, and conductive auxiliary agents that are known as a general conductive auxiliary agent can be used. For example, metal powder, metal fiber, a conductive polymer and the like can be mentioned.

As the carbon-based conductive auxiliary agent and the conductive auxiliary agent other than the carbon-based conductive auxiliary agent, one of the above-described conductive auxiliary agents may be used, or two or more thereof may be used.

The total content of the conductive auxiliary agent in the composition for forming an active material layer is preferably 0.5% to 5% by mass and more preferably 1% to 3% by mass with respect to 100 parts by mass of the solid content. In a case where the content of the conductive auxiliary agent is in the above range, the extreme improvement in electron conductivity is suppressed, the balance between electron conductivity and ion conductivity is improved, and thus the battery capacity when used as an all-solid state secondary battery can be improved. The total content of the conductive auxiliary agent means the total content of the carbon-based conductive auxiliary agent and the conductive auxiliary agent other than the carbon-based conductive auxiliary agent. The content ratio of the carbon-based conductive auxiliary agent in the conductive auxiliary agent is not particularly limited as long as it is within the above-described range of the total content, and for example, it may be 10% by mass or more and is preferably 50% to 100% by mass with respect to the total content of the conductive auxiliary agent.

The shape of the conductive auxiliary agent is not particularly limited but is preferably a particle shape. The median diameter D50 of the conductive auxiliary agent is not particularly limited, and is, for example, preferably 0.01 to 1 μm, and more preferably 0.02 to 0.1 μm.

<Dispersion Medium>

The composition for forming an active material layer according to the embodiment of the present invention contains a dispersion medium that disperses each component contained in the composition for forming an active material layer according to the embodiment of the present invention, in particular, a sulfide-based solid electrolyte, an active material, and a conductive auxiliary agent.

The dispersion medium contains at least one ketone compound dispersion medium in which two aliphatic groups each having 4 or more carbon atoms are bonded to a carbonyl group. Therefore, the configuration in which the composition for forming an active material layer contains a dispersion medium may be any one of a configuration including only one kind of the above-described ketone compound dispersion medium, a configuration including two or more kinds of the above-described ketone compound dispersion medium, and a configuration including at least one kind of the above-described ketone compound dispersion medium and another dispersion medium. A configuration including only one kind of the above-described ketone compound dispersion medium, or a configuration including one kind of the above-described ketone compound dispersion medium and another dispersion medium is preferred.

The dispersion medium used in the present invention includes, in addition to a configuration including non-aqueous dispersion medium (containing no aqueous dispersion medium), a configuration including an aqueous dispersion medium. However, in the configuration including the aqueous dispersion medium, the content of the aqueous dispersion medium is suitably determined within a range not exceeding the above-described water content in the composition for forming an active material layer. In the present invention, the non-aqueous dispersion medium generally refers to a dispersion medium other than water. In a case where the dispersion medium is a non-aqueous dispersion medium, decomposition or deterioration of the sulfide-based solid electrolyte can be prevented.

(Ketone Compound Dispersion Medium)

The ketone compound dispersion medium as a dispersion medium is a ketone compound in which two aliphatic groups each having 4 or more carbon atoms are bonded to a carbonyl group.

Each of the aliphatic groups each having two bonds to the carbonyl group is preferably a saturated aliphatic hydrocarbon group (alkyl group) and has 4 or more carbon atoms, and preferably 4 or 5 carbon atoms.

Each of the two aliphatic groups may have any of a linear chain structure, a branched chain structure, or a cyclic structure, is preferably a linear chain structure or a branched chain structure, and more preferably a branched chain structure in terms of the dispersibility of the sulfide-based solid electrolyte, the active material, and the conductive auxiliary agent.

The two aliphatic groups may be the same or different from each other but are preferably the same in terms of dispersibility of the sulfide-based solid electrolyte, the active material, and the conductive auxiliary agent.

The two aliphatic groups may bind each other to form a ring.

The aliphatic group is not particularly limited, but examples thereof include, n-butyl, sec-butyl, iso-butyl, t-butyl, neopentyl (2,2-dimethylpropyl), isopentyl (3-methylbutyl), sec-pentyl (1-methylbutyl), 3-pentyl (1-ethylpropyl), and tert-pentyl (1,1-dimethylpropyl).

The ketone compound dispersion medium described above may be a compound in which the above aliphatic groups are suitably combined, and in particular, is preferably a compound in which two aliphatic groups are the same and have a branched chain structure. Such a ketone compound dispersion medium is not particularly limited, and examples thereof include di (sec-butyl) ketone, di (iso-butyl) ketone, di (t-butyl) ketone, and di (isopentyl) ketone.

The ketone compound dispersion medium contained in the composition for forming an active material layer may be one kind or two or more kinds.

As described above, the dispersion medium may include a dispersion medium other than the ketone compound dispersion medium in addition to the ketone compound dispersion medium. Such a dispersion medium is not particularly limited as long as it is other than the ketone compound dispersion medium, and examples thereof include various organic dispersion media. Examples of the organic dispersion media that can be used in combination with the ketone compound dispersion medium include a dispersion medium constituted of an ether compound, a dispersion medium constituted of an amide compound, a dispersion medium constituted of an amine compound, a dispersion medium constituted of an aromatic compound, and a dispersion medium constituted of an aliphatic compound, a dispersion medium constituted of a nitrile compound, and a dispersion medium constituted of an ester compound. Among these, a non-polar dispersion medium is preferred. In the present invention, the non-polar dispersion medium refers to a dispersion medium formed from a carbon atom and a hydrogen atom. As the non-polar solvent, a dispersion medium constituted of an aromatic hydrocarbon compound or a dispersion medium constituted of an aliphatic hydrocarbon compound are mentioned, a dispersion medium constituted of an aliphatic hydrocarbon compound are more preferred, and a compound constituted of a saturated aliphatic hydrocarbon is still more preferred.

Examples of the dispersion media constituted of an aromatic hydrocarbon compound include benzene, toluene, and xylene.

The dispersion medium constituted of an aliphatic hydrocarbon compound is not particularly limited as long as it is a dispersion medium of an aliphatic hydrocarbon compound, but a dispersion medium constituted of a saturated aliphatic hydrocarbon compound (alkane dispersion medium) is preferred. The dispersion medium constituted of an aliphatic hydrocarbon compound may have any of a linear chain structure, a branched chain structure, or a cyclic structure.

Examples of the dispersion media constituted of an aliphatic hydrocarbon compound include an alkane compound dispersion medium having 6 to 10 carbon atoms such as hexane, heptane, octane, decane, cyclohexane, and cyclooctane, paraffin, gasoline, naphtha, kerosene, light oil, and the like.

The organic dispersion medium that can be used in combination may be one kind or two or more kinds.

The total content of the dispersion medium in the composition for forming an active material layer is not particularly limited, but is preferably 20% to 80% by mass, more preferably 30% to 70% by mass, and particularly preferably 40% to 60% by mass.

The content of the ketone compound dispersion medium in the composition for forming an active material layer is not particularly limited as long as the total content of the dispersion medium is within the above range. For example, the content thereof in the composition for forming an active material layer is preferably 1% to 80% by mass, more preferably 1.5% to 70% by mass, and still more preferably 2% to 50% by mass. The content of the ketone compound dispersion medium means the total content in a case where the composition for forming an active material layer contains two or more kinds of ketone compound dispersion media.

The content of the organic dispersion medium that can be used in combination in the composition for forming an active material layer is not particularly limited as long as the total content of the dispersion medium is within the above range. For example, the content thereof in the composition for forming an active material layer is preferably 1% to 75% by mass, more preferably 1.5% to 70% by mass, and still more preferably 2% to 50% by mass. The content of the organic dispersion medium that can be used in combination means the total content in a case where the composition for forming an active material layer contains two or more kinds of organic dispersion media.

In the composition for forming an active material layer, the content of the ketone compound dispersion medium in the dispersion medium is 100% by mass or less and can be set suitably depending on the kind, the content, or the like of the sulfide-based solid electrolyte, the active material layer, or the conductive auxiliary agent. For example, the lower limit of the content of the ketone compound dispersion medium in the dispersion medium is preferably 1% by mass or more, and more preferably 2% by mass or more. In case of using in combination with the organic dispersion medium described above, the upper limit of the content of the ketone compound dispersion medium in the dispersion medium can be set to, for example, 50% by mass or less.

<Binder>

The composition for forming an active material layer of the present invention may contain a binder.

The binder is not particularly limited as long as it is a binder polymer usually used in a composition for forming an active material layer for an all-solid state secondary battery. A binder made of a (meth)acrylic polymer, a urethane polymer, a urea polymer, an amide polymer, an imide polymer, an ester polymer, hydrocarbon rubber, fluorine rubber, or the like is preferably exemplified.

The (meth)acrylic polymer is not particularly limited as long as the (meth)acrylic polymer is a polymer formed of a (meth)acrylic monomer, and examples thereof include polymethyl (meth)acrylate, poly(meth)acrylic acid, polyhydroxymethyl (meth)acrylate, and the like. In addition, a polymer described in JP2015-088486A is also suitably exemplified.

As the urethane polymer, the urea polymer, the amide polymer, the imide polymer, and the ester polymer, polymers described in JP2015-088480A are preferably exemplified respectively.

As the hydrocarbon rubber, natural rubber, polybutadiene, polyisoprene, polystyrene-butadiene, and hydrated polymers thereof are exemplified.

The fluorine rubber preferably has a repeating unit derived from vinylidene fluoride, and, as such a polymer, polyvinylidene difluoride, polyvinylidene difluoride hexafluoropropylene, and the like are exemplified.

The binder is preferably polymer particles. In this case, the average particle diameter of the polymer particles is preferably 0.01 to 10 μm and more preferably 0.01 to 1 μm. As the average particle diameter of the polymer particles, a median diameter measured in the same manner as the above-described median diameter of the sulfide-based solid electrolyte particles is employed.

The average particle diameter can be measured from the manufactured all-solid state secondary battery by, for example, disassembling the battery, peeling the electrodes off, then measuring the average particle diameters of the electrode materials, and excluding the measurement value of the average particle diameter of particles other than the polymer particles which has been measured in advance.

As the polymer particles, commercially available polymer particles may be used, and polymer particles described in JP2016-139511A can be suitably used.

The weight-average molecular weight of the binder, particularly, the above-described polymer is preferably 10,000 or more, more preferably 20,000 or more, and still more preferably 30,000 or more. The upper limit is preferably 1,000,000 or less, more preferably 200,000 or less, and still more preferably 100,000 or less.

In the present invention, unless particularly otherwise described, the weight-average molecular weight of the binder refers to a standard polystyrene-equivalent weight-average molecular weight by gel permeation chromatography (GPC). Regarding a measurement method thereof, basically, a value measured using a method under conditions A or conditions B (preferred) described below is employed. However, depending on the kind of the binder polymer, an appropriate eluent may be appropriately selected and used.

(Conditions A)
Column: Two TOSOH TSKgel SuperAWM-H (trade name) are connected to each other.
Carrier: 10 mM LiBr/N-methyl pyrrolidone
Measurement temperature: 40° C.
Carrier flow rate: 1.0 mL/min
Concentration of specimen: 0.1% by mass
Detector: Refractive index (RI) detector (Conditions B) Preferred
Column: A column obtained by connecting TOSOH TSKgel SuperHZM-H (trade name), TOSOH TSKgel SuperHZ4000 (trade name), and TOSOH TSKgel SuperHZ2000 (trade name) is used.
Carrier: Tetrahydrofuran
Measurement temperature: 40° C.
Carrier flow rate: 1.0 mL/min
Concentration of specimen: 0.1% by mass
Detector: Refractive index (RI) detector The content of the binder in the composition for forming an active material layer is preferably 0.01% by mass or more, more preferably 0.1% by mass or more, and still more preferably 1% by mass or more with respect to 100% by mass of the solid component in terms of compatibility of the binding property with the solid particle such as the sulfide-based solid electrolyte particle, the active material, and the conductive auxiliary agent, and the ion conductivity. From the viewpoint of battery characteristics, the upper limit is preferably 20% by mass or less, more preferably 10% by mass or less, and still more preferably 5% by mass or less.

In the composition for forming an active material layer according to the embodiment of the present invention, the mass ratio of the total mass (total amount) of the sulfide-based solid electrolyte and the active material to the mass of the binder [(the mass of the sulfide-based solid electrolyte and the mass of the active material)/(the mass of the binder)] is preferably in a range of 1,000 to 1. This ratio is more preferably 500 to 2 and still more preferably 100 to 10.

One type of binder may be used singly, or two or more kinds thereof may be used in combination.

<Other Additives>

The composition for forming an active material layer according to the embodiment of the present invention may further include, as desired, a thickener, a crosslinking agent (an agent that undergoes a crosslinking reaction by radical polymerization, condensation polymerization, or ring-opening polymerization, or the like), a polymerization initiator (an initiator that generates an acid or a radical by heat or light or the like), an antifoaming agent, a leveling agent, a dehydration agent, an antioxidant, and the like as a component other than the above components.

[Method for Manufacturing Composition for Forming Active Material Layer]

The composition for forming an active material layer of the embodiment of the present invention can be prepared preferably as a slurry by mixing the sulfide-based solid electrolyte, the active material, the conductive auxiliary agent, and as necessary, the above-described components using various mixers in the presence of a dispersion medium containing at least one kind of the ketone compound dispersion medium described above.

The mixing method is not particularly limited, and mixing may be performed collectively or sequentially. For example, the active material, the conductive auxiliary agent, the binder, other additives, and the like may be mixed when the sulfide-based solid electrolyte and the dispersion medium are mixed, or may be separately mixed. In a case where the carbon-based conductive auxiliary agent and a conductive auxiliary agent other than the carbon-based conductive auxiliary agent are used in combination as the conductive auxiliary agent, the carbon-based conductive auxiliary agent and the conductive auxiliary agent other than the carbon-based conductive auxiliary agent may be mixed simultaneously or sequentially.

The composition for forming an active material layer can be prepared by mixing the above components using various mixers. The mixer is not particularly limited, and examples thereof include a ball mill, a beads mill, a planetary mixer, a blade mixer, a roll mill, a kneader, and a disc mill. The mixing conditions are not particularly limited. For example, the mixing temperature is set at 10° C. to 60° C., the mixing time is set at 5 to 5 hours, and the rotation speed is set at 10 to 700 rpm (rotation per minute). In a case where a ball mill is used as the mixer, it is preferable to set the rotation speed at 150 to 700 rpm and the mixing time at 5 minutes to 24 hours at the mixing temperature described above. In addition, the blending quantity of each component is preferably set so that it becomes the content described above.

The mixing environment is not particularly limited, but may be in dry air or in an inert gas.

The composition for forming an active material layer is preferably prepared by a method having a step of preliminarily dispersing (stirring) a sulfide-based solid electrolyte in a dispersion medium including at least one ketone compound dispersion medium in which two aliphatic groups each having 4 or more carbon atoms are bonded to a carbonyl group and a step of mixing the obtained preliminary dispersion, an active material, and a conductive auxiliary agent. By this manufacturing method (referred to as the method for manufacturing the composition for forming an active material layer according to the embodiment of the present invention), deterioration of the sulfide-based solid electrolyte is prevented, and the sulfide-based solid electrolyte, the active material, and the conductive auxiliary agent can be dispersed with good dispersibility. Accordingly, in a case where an electrode sheet for an all-solid state secondary battery or an all-solid state secondary battery is manufactured by the method for manufacturing the composition for forming an active material layer according to the embodiment of the present invention or by using the composition for forming an active material layer obtained by this manufacturing method, further improvement in conductivity or battery capacity can be expected.

In the method for manufacturing the composition for forming an active material layer of the present invention, first, the sulfide-based solid electrolyte is preliminarily dispersed (stirred) in a dispersion medium. The dispersion medium used is as described above, and the preferred configuration is also the same as above. In the preliminary dispersion step, the mixing conditions at the time of preparing the composition for forming an active material layer, preferably the mixing conditions in a case where a ball mill is used, can be applied.

In the step of performing preliminary dispersion, in terms of improving the dispersibility of the sulfide-based solid electrolyte and in particular, reducing the size of the sulfide-based solid electrolyte (cracking aggregates or the like), a mixing method or stirring method in which a mechanical shearing force (stirring action) acts on the sulfide-based solid electrolyte is preferred. For example, among the above mixers, it is preferable to use a mixer such as a ball mill, a bead mill, and a planetary mixer. By such a step, it is possible to suppress deterioration of the sulfide-based solid electrolyte and further enhance dispersibility in the dispersion medium. In this step of performing preliminary dispersion, the degree to which the sulfide-based solid electrolyte is reduced is not particularly limited, but for example, the median diameter is preferably set to 3.0 μm or less and more preferably 2.0 μm or less.

In this step of performing preliminary dispersion, components other than the active material and the conductive auxiliary agent may be mixed.

In this way, a preliminary dispersion of the sulfide-based solid electrolyte can be obtained.

Next, in the method for manufacturing the composition for forming an active material layer of the present invention, a step of mixing the obtained preliminary dispersion of the sulfide-based solid electrolyte, the active material, and the conductive auxiliary agent is performed. The active material and the conductive auxiliary agent are as described above, and the preferred ones are also the same as above.

In this mixing step, the dispersion medium for mixing (dispersing) the above components may be the dispersion medium contained in the preliminary dispersion, or a new dispersion medium different from the dispersion medium can be used. In the present invention, it is preferable to use the dispersion medium contained in the preliminary dispersion. The dispersion medium newly used may be the same as or different from the dispersion medium used in the preliminary dispersion step.

In the mixing step, a sulfide-based solid electrolyte isolated from the obtained preliminary dispersion and a new dispersion medium may be used as the preliminary dispersion.

The order of mixing with the preliminary dispersion is not particularly limited. The active material and the conductive auxiliary agent may be mixed at the same time, or either one may be mixed first. In addition, in a case where the carbon-based conductive auxiliary agent and a conductive auxiliary agent other than the carbon-based conductive auxiliary agent are used in combination as a conductive auxiliary agent, a mixture of the carbon-based conductive auxiliary agent and the conductive auxiliary agent other than the carbon-based conductive auxiliary agent may be mixed with the preliminary dispersion or the like, and the carbon-based conductive auxiliary agent and the conductive auxiliary agent other than the carbon-based conductive auxiliary agent may be separately mixed with the preliminary dispersion or the like.

The mixing ratio of each component in the mixing step is the same as the content ratio of each component in the composition for forming an active material layer according to the embodiment of the present invention, and the preferred range is also the same.

The mixing conditions may be any condition as long as each component can be mixed and dispersed, and for example, the mixing conditions at the time of preparing the composition for forming an active material layer can be applied. The conditions for mixing are preferably milder than the conditions for preliminary dispersion described above. In a case where a ball mill is used, the mixing conditions at the time of preparing the composition for forming an active material layer, preferably the mixing conditions in the case where a ball mill is used can be applied.

In this way, the composition for forming an active material layer according to the embodiment of the present invention can be prepared.

The composition for forming an active material layer according to the embodiment of the present invention can be dispersed while suppressing re-aggregation even in a case where the carbonaceous material is used as a conductive auxiliary agent. Therefore, as described later, the composition for forming an active material layer is preferably used as a material forming an electrode active material layer of an all-solid state secondary battery or an electrode sheet for an all-solid state secondary battery.

[Solid Electrolyte-Containing Sheet]

The solid electrolyte-containing sheet is a sheet-shaped molded body capable of forming a constituent layer of an all-solid state secondary battery and includes various aspects depending on the use thereof. Examples thereof include a sheet that is preferably used in a solid electrolyte layer (also referred to as a solid electrolyte-containing sheet for an all-solid state secondary battery), a sheet that is preferably used in an electrode or a laminate of an electrode and a solid electrolyte layer (an electrode sheet for an all-solid state secondary battery), and the like. In the present specification, a variety of sheets described above will be collectively referred to as a sheet for an all-solid state secondary battery in some cases.

The electrode sheet for an all-solid state secondary battery (also simply referred to as "electrode sheet") may be a sheet having an active material layer (electrode layer), a sheet having an active material layer (electrode layer) formed on a base material (collector), or a sheet formed of an active material layer (electrode layer) without having a base material. The electrode sheet is a sheet that is suitably used for forming a laminate of an active material layer, or a laminate of a solid electrolyte layer and an active material layer of an all-solid state secondary battery. Accordingly, this electrode sheet is generally a sheet having a collector and an active material layer, and an aspect of having a collector, an active material layer, and a solid electrolyte layer in this order and an aspect of having a collector, an active material layer, a solid electrolyte layer, and an active material layer in this order are also considered as the electrode sheet. The electrode sheet may have other layers as long as the layer has an active material layer. Examples of other layers include a protective layer (stripping sheet), a collector, a coating layer, and the like. The layer thicknesses of each layer constituting the electrode sheet are identical to the layer thicknesses of each layer described later in the section of an all-solid state secondary battery.

The active material layer of the electrode sheet is preferably formed of the composition for forming an active material layer according to the embodiment of the present invention. As a result, the active material layer exhibits a high level of ion conductivity and electron conductivity in a well-balanced manner. In addition, by using this electrode sheet as a material constituting the (negative electrode or positive electrode) active material layer of the all-solid state secondary battery, a high battery capacity can be provided to the all-solid state secondary battery. The content of each component in the active material layer of the electrode sheet is not particularly limited, but is preferably the same as the content of each component in the solid content of the composition for forming an active material layer according to the embodiment of the present invention.

The base material is not particularly limited as long as the base material is capable of supporting the active material layer, and examples thereof include sheet bodies (plate-shaped bodies) such as a material described in the section of the collector described below, an organic material, an inorganic material, and the like. Examples of the organic materials include a variety of polymers and the like, and specific examples thereof include polyethylene terephthalate, polypropylene, polyethylene, cellulose, and the like. Examples of the inorganic materials include glass, ceramic, and the like.

The solid electrolyte sheet for an all-solid state secondary battery and the solid electrolyte layer for an all-solid state secondary battery can be formed of a known solid electrolyte composition. The solid electrolyte sheet for an all-solid state secondary battery and the solid electrolyte layer for an all-solid state secondary battery, generally, does not include any positive electrode active material and/or any negative electrode active material.

The layer thickness of the solid electrolyte layer of the solid electrolyte-containing sheet is identical to the layer thickness of the solid electrolyte layer described in the section of an all-solid state secondary battery. Examples of the solid electrolyte-containing sheets include a sheet having a solid electrolyte layer and a protective layer on a base material in this order and a sheet made of a solid electrolyte layer (a sheet not having a base material).

[Method for Manufacturing Solid Electrolyte-Containing Sheet]

A method for manufacturing a solid electrolyte-containing sheet is not particularly limited. Among the solid electrolyte-containing sheets, the electrode sheet for an all-solid state secondary battery can be manufactured through (including) the method for manufacturing a composition for forming an active material layer according to the embodiment of the present invention. In case of focusing on the raw material used, the solid electrolyte-containing sheet can also be manufactured using the composition for forming an active material layer of the embodiment of the present invention. For example, the composition for forming an active material layer according to the embodiment of the present invention is prepared as described above, and the obtained composition for forming an active material layer is made into a film (coated and dried) onto a base material (other layers may be interposed) to form an active material layer (coated and dried layer) on the base material. Accordingly, it is possible to manufacture an electrode sheet having a base material and a coated and dried layer. The composition for forming an active material layer according to the embodiment of the present invention, even during the coating and drying, suppresses both deterioration or decomposition of the sulfide-based solid electrolyte and re-aggregation of the sulfide-based solid electrolyte, and thus the excellent dispersion state of the sulfide-based solid electrolyte, the active material, and the conductive auxiliary agent can be maintained. For this reason, the electrode sheet produced using the composition for forming an active material layer according to the embodiment of the present invention can exhibit both ion conductivity and electron conductivity at a high level.

Here, the coated and dried layer refers to a layer formed by coating the composition for forming an active material layer of the embodiment of the present invention and drying the dispersion medium (that is, a layer formed using the composition for forming an active material layer of the embodiment of the present invention and constituted of a composition in which the dispersion medium has been removed from the composition for forming an active material layer of the embodiment of the present invention).

In the method for manufacturing an electrode sheet, the composition for forming an active material layer according to the embodiment of the present invention is preferably used as a slurry, and, as desired, the composition for forming an active material layer according to the embodiment of the present invention can be slurried by a known method. Each step of coating and drying the composition for forming an active material layer of the embodiment of the present invention will be described in the following section of the method for manufacturing an all-solid state secondary battery.

In the method for manufacturing a solid electrolyte-containing sheet of the embodiment of the present invention, the coated and dried layer obtained as described above can be pressurized. The pressurizing condition and the like will be described later in the section of the method for manufacturing an all-solid state secondary battery.

In addition, in the method for manufacturing a solid electrolyte-containing sheet of the embodiment of the present invention, the base material, the protective layer (particularly stripping sheet), or the like can also be stripped.

[All-Solid State Secondary Battery]

The all-solid state secondary battery has a positive electrode active material layer, a negative electrode active material layer facing the positive electrode active material layer, and a solid electrolyte layer disposed between the positive electrode active material layer and the negative electrode active material layer.

The positive electrode active material layer and the negative electrode active material layer of the all-solid state secondary battery, particularly the positive electrode active material layer, are formed of the composition for forming an active material layer of the embodiment of the present invention, and contain a sulfide-based solid electrolyte, an active material, and a conductive auxiliary agent. In a case where the negative electrode active material layer is not formed with the composition for forming an active material layer of the embodiment of the present invention, a layer containing a sulfide-based solid electrolyte, an active material, and suitable components described above, or a lithium metal layer is employed. The solid electrolyte layer contains a solid electrolyte having ion conductivity for a metal belonging to Group I or II of the periodic table and suitable components described above.

As described above, the all-solid state secondary battery provided with an active material layer formed of the composition for forming an active material layer of the present invention (hereinafter, sometimes referred to as the all-solid state secondary battery of the embodiment of the present invention) exhibits a high level of ion conductivity and electron conductivity in a well-balanced manner, and exhibits a high battery capacity.

The lithium metal layer that can constitute the negative electrode active material layer means a layer of a lithium metal and specifically includes a layer formed by depositing or molding lithium powder, a lithium foil, a lithium vapor deposition film, and the like. The thickness of the lithium metal layer is not particularly limited, and may be, for example, 0.01 to 100 μm.

(Positive Electrode Active Material Layer, Solid Electrolyte Layer, and Negative Electrode Active Material Layer)

In the all-solid state secondary battery according to the embodiment of the present invention, as described above, the active material layer, particularly the positive electrode active material layer, is formed of the composition for forming an active material layer of the embodiment of the present invention or the above-described electrode sheet. This active material layer is preferably the same as the solid content of the composition for forming an active material layer or the solid electrolyte-containing sheet, unless otherwise specified for each component and the content of the component.

The thickness of each of the negative electrode active material layer, the solid electrolyte layer, and the positive electrode active material layer is not particularly limited. In case of taking a dimension of an ordinary all-solid state secondary battery into account, the thickness of each of the layers is preferably 10 to 1,000 µM and more preferably 20 µm or more and less than 500 µm. In the all-solid state secondary battery of the embodiment of the present invention, the thickness of at least one layer of the positive electrode active material layer, the solid electrolyte layer, or the negative electrode active material layer is still more preferably 50 µM or more and less than 500 µm.

Each of the positive electrode active material layer and the negative electrode active material layer may include a collector on the side opposite to the solid electrolyte layer.

(Chassis)

Depending on the use, in the all-solid state secondary battery according to the embodiment of the present invention, the basic structure may be directly used as an all-solid state secondary battery, but the basic structure is preferably used after being enclosed in an appropriate chassis in order to have a dry battery form. The chassis may be a metallic chassis or a resin (plastic) chassis. In a case where a metallic chassis is used, examples thereof include an aluminum alloy chassis and a stainless-steel chassis. The metallic chassis is preferably classified into a positive electrode-side chassis and a negative electrode-side chassis and electrically connected to the positive electrode collector and the negative electrode collector respectively. The positive electrode-side chassis and the negative electrode-side chassis are preferably integrated by being joined together through a gasket for short circuit prevention.

Hereinafter, the all-solid state secondary battery of the preferred embodiments of the present invention will be described with reference to FIG. 1, but the present invention is not limited thereto.

FIG. 1 is a cross-sectional view schematically illustrating an all-solid state secondary battery (lithium ion secondary battery) according to a preferred embodiment of the present invention. In case of being seen from the negative electrode side, an all-solid state secondary battery 10 of the present embodiment has a negative electrode collector 1, a negative electrode active material layer 2, a solid electrolyte layer 3, a positive electrode active material layer 4, and a positive electrode collector 5 in this order. Each layer is in contact with each other forms a laminated structure. In a case where the above-described structure is employed, during charging, electrons (e⁻) are supplied to the negative electrode side, and lithium ions (Li⁺) are accumulated on the negative electrode side. On the other hand, during discharging, the lithium ions (Li⁺) accumulated on the negative electrode side return to the positive electrode, and electrons are supplied to an operation portion 6. In an example illustrated in the drawing, an electric bulb is employed as the operation portion 6 and is lit by discharging.

The composition for forming an active material layer according to the embodiment of the present invention can be preferably used as a material used to shape the negative electrode active material layer or the positive electrode active material layer. In addition, the electrode sheet according to the embodiment of the present invention is suitable as the negative electrode active material layer or the positive electrode active material layer.

In the present specification, the positive electrode active material layer (hereinafter, also referred to as the positive electrode layer) and the negative electrode active material layer (hereinafter, also referred to as the negative electrode layer) will be collectively referred to as the electrode layer or the active material layer in some cases.

In a case where an all-solid state secondary battery having the layer constitution shown in FIG. 1 is put into a 2032-type coin case, the all-solid state secondary battery will be referred to as the electrode sheet for an all-solid state secondary battery, and a battery produced by putting this electrode sheet for an all-solid state secondary battery into the 2032-type coin case will be referred to as the all-solid state secondary battery, thereby referring to both batteries distinctively in some cases.

(Positive Electrode Active Material Layer, Solid Electrolyte Layer, and Negative Electrode Active Material Layer)

In the all-solid state secondary battery 10, at least the positive electrode active material layer is formed by using the composition for forming an active material layer of the embodiment of the present invention or the above-described electrode sheet. As a result, the all-solid state secondary battery shows a high battery capacity. The details of the reason for the high battery capacity are as described above.

Each component that the positive electrode active material layer 4, the solid electrolyte layer 3, and the negative electrode active material layer 2 contain may be identical to or different from each other.

The negative electrode active material layer can be formed using the composition for forming an active material layer of the embodiment of the present invention or the above-described electrode sheet, or can be formed using a lithium metal layer.

The positive electrode collector 5 and the negative electrode collector 1 are preferably an electron conductor.

In the present invention, there are cases in which any or both of the positive electrode collector and the negative electrode collector will be simply referred to as the collector.

As a material forming the positive electrode collector, aluminum, an aluminum alloy, stainless steel, nickel, titanium, or the like, and furthermore, a material obtained by treating the surface of aluminum or stainless steel with carbon, nickel, titanium, or silver (a material forming a thin film) is preferred, and, among these, aluminum and an aluminum alloy are more preferred.

As a material forming the negative electrode collector, aluminum, copper, a copper alloy, stainless steel, nickel, titanium, or the like, and furthermore, a material obtained by treating the surface of aluminum, copper, a copper alloy, or stainless steel with carbon, nickel, titanium, or silver is preferred, and aluminum, copper, a copper alloy, or stainless steel is more preferred.

Regarding the shape of the collector, generally, collectors having a film sheet-like shape are used, but it is also possible to use net-shaped collectors, punched collectors, compacts of lath bodies, porous bodies, foaming bodies, or fiber groups, and the like.

The thickness of the collector is not particularly limited, but is preferably 1 to 500 µm. In addition, the surface of the collector is preferably provided with protrusions and recesses by means of a surface treatment.

In the present invention, a functional layer, a functional member, or the like may be appropriately interposed or disposed between each layer of the negative electrode collector, the negative electrode active material layer, the solid electrolyte layer, the positive electrode active material layer, and the positive electrode collector or on the outside thereof. In addition, each layer may be constituted of a single layer or multiple layers.

<Method for Manufacturing of all-Solid State Secondary Battery>

The all-solid state secondary battery according to the embodiment of the present invention is not particularly limited and can be manufactured through (including) the method for manufacturing a composition for forming an active material layer according to the embodiment of the present invention. In case of focusing on the raw material used, the solid electrolyte-containing sheet can also be manufactured using the composition for forming an active material layer of the embodiment of the present invention. Specifically, the all-solid state secondary battery is manufactured by preparing the composition for forming an active material layer of the embodiment of the present invention as described above and by forming a constituent layer of the all-solid state secondary battery using the obtained composition for forming an active material layer or the like. In this way, an all-solid state secondary battery having a high discharging capacity can be manufactured. The method for preparing the composition for forming an active material layer according to the embodiment of the present invention is as described above and thus will not be described.

The all-solid state secondary battery of the embodiment of the present invention can be manufactured using a method including (through) a step of applying the composition for forming an active material layer of the embodiment of the present invention onto a base material (for example, a metal foil which serves as a collector) and forming a coating film (making a film).

For example, the composition for forming an active material layer of the embodiment of the present invention is applied as a composition for a positive electrode onto a metal foil which is a positive electrode collector so as to form a positive electrode active material layer, thereby producing a positive electrode sheet for an all-solid state secondary battery. Next, a solid electrolyte composition for forming a solid electrolyte layer is applied onto the positive electrode active material layer so as to form a solid electrolyte layer. Furthermore, the composition for forming an active material layer of the embodiment of the present invention is applied as a composition for a negative electrode onto the solid electrolyte layer so as to form a negative electrode active material layer. A negative electrode collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. A desired all-solid state secondary battery can also be manufactured by enclosing the all-solid state secondary battery in a chassis.

In addition, it is also possible to manufacture an all-solid state secondary battery by carrying out the methods for forming individual layers in a reverse order so as to form a negative electrode active material layer, a solid electrolyte layer, and a positive electrode active material layer on a negative electrode collector and overlaying a positive electrode collector thereon.

In the above method, the negative electrode active material layer can be formed using a known negative electrode active material composition or a lithium metal foil. The same is applied to the following method.

As another method, the following method can be exemplified. That is, a positive electrode sheet for an all-solid state secondary battery is manufactured as described above. In addition, the composition for forming an active material layer of the embodiment of the present invention is applied as a composition for a negative electrode onto a metal foil which is a negative electrode collector so as to form a negative electrode active material layer, thereby producing a negative electrode sheet for an all-solid state secondary battery. Next, a solid electrolyte layer is formed on the active material layer in any one of these sheets as described above. Furthermore, the other one of the positive electrode sheet for an all-solid state secondary battery and the negative electrode sheet for an all-solid state secondary battery is laminated on the solid electrolyte layer so that the solid electrolyte layer and the active material layer come into contact with each other. An all-solid state secondary battery can be manufactured as described above.

As still another method, the following method can be exemplified. That is, a positive electrode sheet for an all-solid state secondary battery and a negative electrode sheet for an all-solid state secondary battery are manufactured as described above. In addition, separately from the positive electrode sheet for an all-solid state secondary battery and the negative electrode sheet for an all-solid state secondary battery, a solid electrolyte composition is applied onto a base material, thereby manufacturing a solid electrolyte-containing sheet for an all-solid state secondary battery constituted of a solid electrolyte layer. Furthermore, the positive electrode sheet for an all-solid state secondary battery and the negative electrode sheet for an all-solid state secondary battery are laminated together so as to sandwich the solid electrolyte layer that has been peeled off from the base material. An all-solid state secondary battery can be manufactured as described above.

An all-solid state secondary battery can be manufactured by combining the above-described forming methods. For example, a positive electrode sheet for an all-solid state secondary battery, a negative electrode sheet for an all-solid state secondary battery, and a solid electrolyte-containing sheet for an all-solid state secondary battery are manufactured individually. Next, a solid electrolyte layer peeled off from a base material is laminated on the negative electrode sheet for an all-solid state secondary battery and is then attached to the positive electrode sheet for an all-solid state secondary battery, whereby an all-solid state secondary battery can be manufactured. In this method, it is also possible to laminate the solid electrolyte layer on the positive electrode sheet for an all-solid state secondary battery and attach the solid electrolyte layer to the negative electrode sheet for an all-solid state secondary battery.

In each of the above manufacturing methods, at least one of the negative electrode active material layer or the positive electrode active material layer, in particular, a positive electrode active material layer preferably containing a conductive auxiliary agent is formed of the composition for forming an active material layer of the embodiment of the present invention. In a case where the active material layer is formed of a composition other than the composition for forming an active material layer of the embodiment of the present invention, a commonly used composition for forming an active material layer or the like can be mentioned. In addition, the solid electrolyte composition forming the solid electrolyte layer is not particularly limited as long as it is a composition containing a solid electrolyte, and a solid electrolyte composition (not containing an active material) which is commonly used in the manufacture of an all-solid state secondary battery), or the like can be mentioned.

<Formation of Individual Layer (Formation of Film)>

The method of coating the composition for forming an active material layer or each composition commonly used for manufacturing an all-solid state secondary battery is not particularly limited and can be suitably selected. Examples thereof include coating (preferably wet-type coating), spray coating, spin coating, dip coating, slit coating, stripe coating, and bar coating.

At this time, the composition for forming an active material layer or each composition commonly used for manufacturing an all-solid state secondary battery may be dried after being applied or may be dried after being applied to multiple layers. The drying temperature is not particularly limited. The lower limit is preferably 30° C. or higher, more preferably 60° C. or higher, and still more preferably 80° C. or higher. The upper limit is preferably 300° C. or lower, more preferably 250° C. or lower, and still more preferably 200° C. or lower. In a case where the compositions are heated in the above-described temperature range, it is possible to remove the dispersion medium and form a solid state (coated and dried layer). This temperature range is preferred since the temperature is not excessively increased and each member of the all-solid state secondary battery is not impaired. Therefore, in the all-solid state secondary battery, excellent total performance is exhibited, and it is possible to obtain a favorable binding property.

As described above, even in a case where the composition for forming an active material layer is coated and dried, both deterioration or decomposition of the sulfide-based solid electrolyte and re-aggregation of the sulfide-based solid electrolyte are suppressed as described above, and thus the excellent dispersion state of the sulfide-based solid electrolyte, the active material, and the conductive auxiliary agent can be maintained.

After manufacturing the applied composition for forming an active material layer or the like or the all-solid state secondary battery, each layer thereof or the all-solid state secondary battery is preferably pressurized. In addition, each of the layers is also preferably pressurized together in a state of being laminated. Examples of the pressurization methods include a method using a hydraulic cylinder pressing machine and the like. The welding pressure is not particularly limited, but is, generally, preferably in a range of 50 to 1,500 MPa.

In addition, the applied composition for forming an active material layer or the like may be heated at the same time as pressurization. The heating temperature is not particularly limited, but is generally in a range of 30° C. to 300° C. Each of the layers or the all-solid state secondary battery can also be pressed at a temperature higher than the glass transition temperature of the sulfide-based solid electrolyte.

The pressurization may be carried out in a state in which the applied solvent or dispersion medium has been dried in advance or in a state in which the coating solvent or the dispersion medium remains.

The individual compositions may be applied at the same time, and the application, the drying, and the pressing may be carried out simultaneously and/or sequentially. The individual compositions may be applied to separate base materials and then laminated by means of transfer.

The atmosphere during the pressurization is not particularly limited and may be any one of the atmospheres such as an atmosphere under the dried air (the dew point: −20° C. or lower), in an inert gas (for example, in an argon gas, in a helium gas, or in a nitrogen gas), and the like. Since the sulfide solid electrolyte reacts with moisture, the atmosphere during pressurization is preferably an atmosphere under dried air or in an inert gas.

The pressurization time may be a short time (for example, within several hours) under the application of a high pressure or a long time (one day or longer) under the application of an intermediate pressure. In the case of members other than the all-solid electrolyte-containing sheet, for example, the all-solid state secondary battery, it is also possible to use a restraining device (screw fastening pressure or the like) of the all-solid state secondary battery in order to continuously apply an intermediate pressure.

The pressing pressure may be a pressure that is constant or varies with respect to a portion under pressure such as a sheet surface.

The pressing pressure can be changed depending on the area or film thickness of the portion under pressure. In addition, it is also possible to change the pressure to a pressure that varies stepwise at the same portion.

A pressing surface may be flat or roughened.

<Initialization>

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state in which the pressing pressure is increased and then releasing the pressure to a pressure at which the all-solid state secondary battery is ordinarily used.

[Usages of all-Solid State Secondary Battery]

The all-solid state secondary battery of the embodiment of the invention can be applied to a variety of usages. Application aspects are not particularly limited, and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, portable tape recorders, radios, backup power supplies, memory cards, and the like. Additionally, examples of consumer usages include vehicles (electric cars and the like), electric vehicles, motors, lighting equipment, toys, game devices, road conditioners, watches, strobes, cameras, medical devices (pacemakers, hearing aids, shoulder massage devices, and the like), and the like. Furthermore, the all-solid state secondary battery can be used for a variety of military usages and universe usages. In addition, the all-solid state secondary battery can also be combined with a solar battery.

EXAMPLES

Hereinafter, the present invention will be described in more detail on the basis of Examples. Meanwhile, the present invention is not interpreted to be limited thereto. "Parts" and "%" that represent compositions in the following Examples are mass-based unless particularly otherwise described. In addition, "-" used in Table means that the component in the column is not contained.

Synthesis Example 1: Synthesis of Sulfide-Based Solid Electrolyte Li—P—S-Based Glass As a sulfide-based solid electrolyte, Li—P—S-based glass was synthesized with reference to a non-patent document of T. Ohtomo, A. Hayashi, M. Tatsumisago, Y. Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a globe box under an argon atmosphere (dew point: −70° C.), lithium sulfide ($Li_2S$, manufactured by Aldrich-Sigma, Co. LLC. Purity: >99.98%) (2.42 g) and diphosphorus pentasulfide ($P_2S_5$, manufactured by Aldrich-Sigma, Co. LLC. Purity: >99%) (3.90 g) each were weighed, injected into an agate mortar, and mixed using an agate muddler for five minutes. The mixing ratio of $Li_2S$ to $P_2S_5$ was set to 75:25 in terms of molar ratio.

Sixty six zirconia beads having a diameter of 5 mm were put into a 45 mL zirconia container (manufactured by Fritsch Japan Co., Ltd.), the total amount of the mixture of the lithium sulfide and the diphosphorus pentasulfide was put thereinto, and the container was sealed in an argon atmosphere. The container was set in a planetary ball mill P-7 (trade name) manufactured by Fritsch Japan Co., Ltd., mechanical milling was carried out at a temperature of 25° C. and a rotation speed of 510 rpm for 20 hours, thereby obtaining yellow powder (6.20 g) of a sulfide-based solid electrolyte (Li—P—S-based glass). The ion conductivity was 0.28 mS/cm.

Example 1

In Example 1, a composition for a positive electrode and a positive electrode sheet for an all-solid state secondary battery were manufactured, and the ion conductivity and the electron conductivity of the positive electrode sheet were measured.

<Production of Positive Electrode Sheet for all-Solid State Secondary Battery>

—Preparation of Composition for Positive Electrode—

In a dried air environment (the dew point: −60° C.), lithium nickel manganese cobalt oxide (NMC, median diameter: 3 µm according to the above-described measurement method) as the positive electrode active material, the sulfide-based solid electrolyte Li—P—S-based glass (median diameter: 7 µm according to the above-described measurement method) synthesized in Synthesis Example 1, and acetylene black (median diameter: 50 nm according to the above-described measurement method) as a conductive auxiliary agent were mixed so that the mass ratio thereof became 80:18:2, and the mixture was added to a planetary mixer (Hibis mix 2P-03 (trade name), manufactured by PRIMIX Corporation). Next, a dispersion medium shown in Table 1 as the dispersion medium was added to the planetary mixer so that the concentration of solid contents became 40% by mass, and the mixture was stirred and mixed at 50 rpm for 1 hour at room temperature (25° C.) to prepare a composition (slurry) for a positive electrode as a non-aqueous composition.

—Preparation of Positive Electrode Sheets A-1 to A-4 and B-1 to B-14 for all-Solid State Secondary Battery—

Each of the obtained compositions for a positive electrode was applied onto a carbon-coated aluminum foil having a thickness of 20 µm using an applicator (trade name: SA-201, Baker-type applicator, manufactured by Tester Sangyo Co., Ltd.), dried by heating at 100° C. for 1 hour, and each of positive electrode sheets A-1 to A-4 and B-1 to B-14 for an all-solid state secondary battery was prepared. The thicknesses of the positive electrode active material layers were 100 µm.

—Preparation of Positive Electrode Sheet A-5 for all-Solid State Secondary Battery—

A positive electrode sheet A-5 for an all-solid state secondary battery was prepared in the same manner as in the preparation of the positive electrode sheet A-1 for an all-solid state secondary battery except that a positive electrode active material, a sulfide-based solid electrolyte, and a conductive auxiliary agent were mixed so that the mass ratio thereof became 80:16:4 to prepare a composition (slurry) for a positive electrode as a non-aqueous composition in the preparation of the positive electrode sheet A-1 for an all-solid state secondary battery.

—Preparation of Positive Electrode Sheet B-15 for all-Solid State Secondary Battery—

A positive electrode sheet B-15 for an all-solid state secondary battery was prepared in the same manner as in the preparation of the positive electrode sheet B-1 for an all-solid state secondary battery except that a positive electrode active material, a sulfide-based solid electrolyte, and a conductive auxiliary agent were mixed so that the mass ratio thereof became 80:16:4 to prepare a composition (slurry) for a positive electrode as a non-aqueous composition in the preparation of the positive electrode sheet B-1 for an all-solid state secondary battery.

<Evaluation 1: Measurement of Electron Conductivity>

Each of the prepared positive electrode sheets A-1 to A-5 and B-1 to B-15 for an all-solid state secondary battery was punched out into two circular sheets having a diameter of 10 mm, and the two circular sheets were laminated so that the positive electrode active material layers thereof faced each other. The obtained laminate was restrained in the thickness direction with a stainless steel (SUS) rod to prepare a measurement cell. The measurement cell (between the positive electrode sheets for an all-solid state secondary battery) was pressurized by applying a pressure of 350 MPa. After the pressurization was released, a voltage of 5 mV was applied to the measurement cell in a constant-temperature tank at 30° C. while applying a pressure of 50 MPa again to the measurement cell, and the electron conductivity was determined from the direct current resistance.

The electron conductivity in each measurement cell prepared from the positive electrode sheets A-1 to A-5 and B-1 to B-15 for an all-solid state secondary battery was divided by the electron conductivity in the measurement cell prepared from the positive electrode sheet A-1 for an all-solid state secondary battery to calculate the electron conductivity (relative value) of each measurement cell.

In the present test, the higher the electron conductivity (relative value) is, the higher the electron conductivity of the positive electrode sheet for an all-solid state secondary battery is.

<Evaluation 2: Measurement of Ion Conductivity>

Each of the prepared positive electrode sheets A-1 to A-5 and B-1 to B-15 for an all-solid state secondary battery was punched out into two circular sheets having a diameter of 10 mm, and one of the circular sheets was placed in a cylinder having a diameter of 10 mmφ made of polyethylene terephthalate (PET). 30 mg of the sulfide-based solid electrolyte Li—P—S-based glass synthesized as above was put on the surface of the positive electrode active material layer in the cylinder, and a SUS rod of 10 mmφ was inserted from both ends of the opening member of the cylinder to sandwich the punched-out circular positive electrode sheet for an all-solid state secondary battery and the Li—P—S-based glass. In this state, the solid electrolyte layer was formed by pressure-molding with two SUS rods at a pressure of 350 MPa. Thereafter, the SUS rod disposed on the solid electrolyte layer side was once removed, and the remaining punched-out circular positive electrode sheet for an all-solid state secondary battery was inserted onto the solid electrolyte layer in the cylinder. The removed SUS rod was inserted again into the cylinder and pressure-molded with two SUS rods at a pressure of 350 MPa. Thereafter, the two SUS rods were fixed while pressurizing again at 50 MPa. In this way, a cell for evaluating ion conductivity having a laminated structure of SUS rod/positive electrode active material layer/solid electrolyte layer/positive electrode active material layer/SUS rod was prepared.

The alternating current impedance of the prepared cell for evaluating ion conductivity was measured in a constant-temperature tank (30° C.) using a 1255B FREQUENCY RESPONSE ANALYZER (trade name, manufactured by SOLARTRON Analytical) at a voltage magnitude of 5 mV and a frequency of 1 MHz to 1 Hz. From the measurement results of the impedance and the electron conductivity of the positive electrode active material, the ion conductivity was calculated using the method described in Journal of Power Sources, 316, 2016, pp. 215-223.

The ion conductivity in each cell for evaluating ion conductivity prepared from the positive electrode sheets A-1 to A-5 and B-1 to B-15 for an all-solid state secondary battery was divided by the ion conductivity in the cell for evaluating ion conductivity prepared from the positive electrode sheet A-1 for an all-solid state secondary battery to calculate the ion conductivity (relative value) in each cell for evaluating ion conductivity.

In the present test, the higher the ion conductivity (relative value) is, the higher the ion conductivity of the positive electrode sheet for an all-solid state secondary battery is.

agent cannot be sufficiently mixed. As a result, the positive electrode sheet B-1 for an all-solid state secondary battery had extremely low electron conductivity, and the positive electrode sheet B-15 for an all-solid state secondary battery had extremely low electron conductivity and extremely low ion conductivity.

In addition, even in a case of a ketone compound dispersion medium, in a case where at least one aliphatic group of a ketone compound has carbon atoms equal to or less 3, the ketone compound dispersion medium reacts with the sulfide-based solid electrolyte, and the ion conductivity of the sulfide-based solid electrolyte itself is decreased, and thus the ion conductivity of the positive electrode sheets B-2 to B-7 for an all-solid state secondary battery became low. Moreover, the sulfide-based solid electrolyte, the active material, and the conductive auxiliary agent cannot be sufficiently mixed and dispersed, and the electron conductivity of the positive electrode sheet for an all-solid state secondary battery is not sufficient.

Further, in a case where a dispersion medium other than the ketone compound dispersion medium was used, the sulfide-based solid electrolyte, the active material, and the conductive auxiliary agent could not be sufficiently dispersed, and the positive electrode sheets B-8 to B-14 had insufficient electron conductivity.

In contrast, the ion conductivity and the electronic conductivity can be compatible at a high level in any positive electrode sheets A-1 to A-4 for an all-solid state secondary battery manufactured from the composition for forming an active material layer that contains the ketone compound dispersion medium defined as the dispersion medium in the present invention. The reason for the high electron conduc-

TABLE 1

| Positive electrode sheet for all-solid state secondary battery | Dispersion medium | Ion conductivity (relative value) | Electron conductivity (relative value) | Notes |
|---|---|---|---|---|
| B-1 | Heptane | 1.03 | 0.02 | Comparative example |
| A-1 | Dibutyl ketone | 1.00 (criterion) | 1.00 (criterion) | Example |
| A-2 | Ditertiarybutyl ketone | 1.04 | 0.91 | Example |
| A-3 | Diisobutyl ketone | 1.05 | 1.13 | Example |
| A-4 | Diisopentyl ketone | 1.05 | 1.06 | Example |
| B-2 | Acetone | 0.23 | 0.71 | Comparative example |
| B-3 | Metylethyl ketone | 0.27 | 0.75 | Comparative example |
| B-4 | Methylisobutyl ketone | 0.26 | 0.69 | Comparative example |
| B-5 | Cyclohexanone | 0.22 | 0.64 | Comparative example |
| B-6 | Diisopuropyl ketone | 0.72 | 0.78 | Comparative example |
| B-7 | Ethylisobutyl ketone | 0.2 | 0.71 | Comparative example |
| B-8 | Dipropyl ether | 1.04 | 0.19 | Comparative example |
| B-9 | Diisopropyl ether | 1.05 | 0.22 | Comparative example |
| B-10 | Dibutyl ether | 1.04 | 0.22 | Comparative example |
| B-11 | Diisobutyl ether | 1.04 | 0.26 | Comparative example |
| B-12 | Diisopentyl ether | 1.05 | 0.39 | Comparative example |
| B-13 | Butyl butyrate | 1.04 | 0.55 | Comparative example |
| B-14 | Isobutyl isobutyrate | 1.03 | 0.43 | Comparative example |
| A-5 | Dibutyl ketone | 0.4 | 5 | Example |
| B-15 | Heptane | 0.3 | 0.1 | Comparative example |

As is clear from Table 1, the ion conductivity and the electron conductivity cannot be compatible in any positive electrode sheets B-1 to B-15 for an all-solid state secondary battery manufactured from the composition for forming an active material layer that does not contain the ketone compound dispersion medium defined as the dispersion medium in the present invention.

Specifically, in a case where heptane which is a nonpolar dispersion medium is used singly, the sulfide-based solid electrolyte, the active material, and the conductive auxiliary tivity is considered to be that since acetylene black which is a conductive auxiliary agent is dispersed with good dispersibility (uniformly) even in a small amount in the composition for forming an active material layer of the embodiment of the present invention, the conductive auxiliary agent is dispersed throughout the positive electrode active material layer formed of the above composition for forming an active material layer.

In the positive electrode sheet A-5 for an all-solid state secondary battery, it has been confirmed that since the content of acetylene black is increased and the content of the sulfide-based solid electrolyte is reduced, the ion conductivity is decreased compared with the positive electrode sheets A-1 to A-4 for an all-solid state secondary battery, but the electron conductivity and the ion conductivity are improved compared with the positive electrode sheet B-15 for an all-solid state secondary battery having the same ratio of acetylene black and the sulfide-based solid electrolyte.

As described above, it can be seen that the composition for forming an active material layer of the embodiment of the present invention is used for forming an active material layer of an all-solid state secondary battery, and thus an electrode sheet for an all-solid state secondary battery showing high ion conductivity and high electron conductivity can be prepared. It is also can be seen that in a case where an all-solid state secondary battery is manufactured using the electrode sheet for an all-solid state secondary battery having such excellent characteristics, a high battery capacity is exhibited.

Example 2

In Example 2, a composition for a positive electrode, a positive electrode sheet for an all-solid state secondary battery, and an all-solid state secondary battery were manufactured, and the battery capacity of the all-solid state secondary battery was measured.

<Production of Positive Electrode Sheet for all-Solid State Secondary Battery>

—Preparation of Composition for Positive Electrode—

A step of performing preliminary dispersion in the method for manufacturing a composition for forming an active material layer of the embodiment the present invention was performed as follows.

That is, 160 zirconia beads having a diameter of 5 mm were put into a 45 mL zirconia container (manufactured by Fritsch Japan Co., Ltd.), and 4.0 g of the sulfide-based solid electrolyte Li—P—S-based glass synthesized in Synthesis Example 1 and a dispersion medium shown in Table 2 were added thereto. Thereafter, the container was set in a planetary ball mill P-7 manufactured by Fritsch Japan Co., Ltd., and wet-type dispersion was performed at room temperature and a rotation speed of 350 rpm for 60 minutes to prepare a preliminary dispersion (slurry 1) of a solid electrolyte composition and the dispersion medium. Table 2 shows the median diameter of the Li—P—S-based glass in the slurry 1.

Next, a mixing step was performed. That is, in a 45 mL zirconia container (manufactured by Fritsch Japan Co., Ltd.), lithium nickel manganese cobalt oxide (NMC, median diameter: 3 μm) as the positive electrode active material, acetylene black as the conductive auxiliary agent (median diameter: 50 nm according to the above-described measurement method), and the dispersion medium the same as the dispersion medium used in the above-described step of performing preliminary dispersion were added to the slurry 1. Then the container was set in a planetary ball mill P-7 manufactured by Fritsch Japan Co., Ltd., and wet-type dispersion was performed at room temperature and a rotation speed of 150 rpm for 10 minutes. In this way, a positive electrode composition (slurry 2) was prepared as a non-aqueous composition.

The mixing amount of each of the above components was set so that the mass ratio of lithium nickel manganese cobalt oxide, the sulfide-based solid electrolyte, and acetylene black became 80:18:2. Further, the dispersion medium was added, and the concentration of solid contents of the composition for a positive electrode was set to 50% by mass.

—Preparation of Positive Electrode Sheets C-1 to C-9 and D-1 to D-5 for all-Solid State Secondary Battery—

Each of the obtained compositions for a positive electrode was applied onto a carbon-coated aluminum foil having a thickness of 20 μm using an applicator (trade name: SA-201, Baker-type applicator, manufactured by Tester Sangyo Co., Ltd.), dried by heating at 100° C. for 1 hour, and each of positive electrode sheets C-1 to C-9 and D-1 to D-5 for an all-solid state secondary battery was prepared. The thicknesses of the positive electrode active material layers were 100 μm.

In the preparation of the positive electrode sheets C-1, C-5, and D-1 to D-4 for an all-solid state secondary battery, the above-described step of performing preliminary dispersion was not performed, and each of the composition for positive electrode was prepared using the sulfide-based solid electrolyte (median diameter: 7 μm) synthesized in Synthesis Example 1 instead of the slurry 1.

In addition, a positive electrode sheet D-5 for an all-solid state secondary battery was prepared in the same manner as in the preparation of the positive electrode sheet C-1 for an all-solid state secondary battery except that acetylene black was not added, that the mass ratio of lithium nickel manganese cobalt oxide to the sulfide-based solid electrolyte was set to be 82:18, and that the composition for the positive electrode was prepared in the preparation of the positive electrode sheet C-1 for an all-solid state secondary battery.

<Evaluation: Evaluation of Battery Characteristics>

Each of the prepared positive electrode sheets C-1 to C-9 and D-1 to D-5 for an all-solid state secondary battery was punched out into a circular sheets having a diameter of 10 mm, and was placed in a cylinder made of PET having an inner diameter of 10 mm. 30 mg of the sulfide-based solid electrolyte Li—P—S-based glass synthesized as above was put on the surface of the positive electrode active material layer in the cylinder, and a SUS rod of 10 mmφ was inserted from both ends of the opening member of the cylinder. A substrate (aluminum foil) side of the positive electrode sheet for an all-solid state secondary battery and the sulfide-based solid electrolyte were pressure-formed with the SUS rods at a pressure of 350 MPa to form a solid electrolyte layer. Thereafter, the SUS rod disposed on the solid electrolyte layer side was once removed, and a circular indium (In) sheet having a diameter of 9 mm (thickness: 20 μm) and a circular lithium (Li) sheet having a diameter of 9 mm (thickness: 20 μm) were inserted in this order onto the sulfide solid electrolyte in the cylinder. The removed SUS rod was inserted again into the cylinder and the circular sheets were fixed while applying a pressure of 50 MPa. In this way, all-solid state secondary batteries C-1 to C-9 and D-1 to D-5 respectively including positive electrode sheets C-1 to C-9 and D-1 to D-5 for an all-solid state secondary battery as the positive electrode active material layer were manufactured.

The charging and discharging characteristics of the prepared all-solid state secondary batteries were measured using a charging and discharging evaluation device (TOSCAT-3000 manufactured by Toyo systems Development Co., Ltd.). Charging was performed at a current density of 0.5 mA/cm² until the charging voltage reached 3.6 V, and after reaching 3.6 V, charging was performed at a constant voltage until the current density became less than 0.05 mA/cm². Discharging was performed at a current density of 0.5 mA/cm² until the voltage reached 1.9 V. This charging and discharging was regarded as one cycle, this cycle was repeated three times, and the discharging capacity at the third cycle was measured.

The discharging capacity in each all-solid state secondary battery prepared from the positive electrode sheets C-1 to C-9 and D-1 to D-5 for an all-solid state secondary battery was divided by the discharging capacity in the all-solid state secondary battery C-3 to calculate the discharging capacity (relative value) of each all-solid state secondary battery.

In the present test, the higher the discharging capacity (relative value) is, the excellent the battery performance of an all-solid state secondary battery is.

step of performing preliminary dispersion is not performed. This is considered to be because the sulfide-based solid electrolyte is disintegrated and micronized in the step of performing preliminary dispersing step.

The present invention has been described together with the embodiment, however, unless particularly specified, the present inventors do not intend to limit the present invention to any detailed portion of the description and consider that the present invention is supposed to be broadly interpreted within the concept and scope of the present invention described in the claims.

TABLE 2

| All-solid state secondary battery | Dispersion medium | | | | Battery | | Notes |
| --- | --- | --- | --- | --- | --- | --- | --- |
| | Ketone compound dispersion medium | Non-polar dispersion medium | Content ratio * | Preliminary dispersion step | Median diameter (μm) | capacity (relative value) | |
| C-1 | Dibutyl ketone | — | 100 | Not performed | 7 | 0.8 | Example |
| C-2 | Dibutyl ketone | — | 100 | Performed | 1.9 | 0.9 | Example |
| C-3 | Ditertiarybutyl ketone | — | 100 | Performed | 1.8 | 1.0 (criterion) | Example |
| C-4 | Ditertiarybutyl ketone | Heptane | 10 | Performed | 1.6 | 1 | Example |
| C-5 | Diisobutyl ketone | — | 100 | Not performed | 7 | 0.9 | Example |
| C-6 | Diisobutyl ketone | — | 100 | Performed | 1.5 | 1 | Example |
| C-7 | Diisobutyl ketone | Heptane | 10 | Performed | 1.7 | 1 | Example |
| C-8 | Diisopentyl ketone | — | 100 | Performed | 1.5 | 1 | Example |
| C-9 | Diisopentyl ketone | Heptane | 10 | Performed | 1.6 | 1 | Example |
| D-1 | Heptane | — | 100 | Not performed | 7 | 0.4 | Comparative example |
| D-2 | Dibutyl ether | — | 100 | Not performed | 7 | 0.6 | Comparative example |
| D-3 | Diisopuropyl ketone | — | 100 | Not performed | 7 | 0.7 | Comparative example |
| D-4 | Isobutyl isobutyrate | — | 100 | Not performed | 7 | 0.7 | Comparative example |
| D-5 | Dibutyl ketone | — | 100 | Not performed | 7 | Unmeasurable | Comparative example |

* Content raitio indicates the content ratio of ketone compound dispersion medium in the dispersion medium.

As is clear from Table 2, the battery capacity was not sufficient in any all-solid state secondary batteries D-1 to D-4 prepared from the composition for forming an active material layer that did not contain the ketone compound dispersion medium defined as the dispersion medium in the present invention. In the all-solid state secondary battery D-5, the charging and discharging characteristics could not be obtained since the electron conductivity was too low.

On the other hand, the battery capacity was high in any all-solid state secondary batteries C-1 to C-9 prepared from the composition for forming an active material layer that contained the ketone compound dispersion medium defined as the dispersion medium in the present invention. It has been found that in a case where the aliphatic group of the ketone compound dispersion medium has a branched chain structure, the all-solid state secondary battery has a higher battery capacity than in a case where the aliphatic group of the ketone compound dispersion medium has a linear chain structure. This is considered to be because the dispersibility of the sulfide-based solid electrolyte, the active material, and the conductive auxiliary agent are further improved and more uniformly dispersed in the composition for forming an active material layer of the embodiment of the present invention. In addition, it has been found that in a case where the step of-performing preliminary dispersion is performed and the median diameter of the sulfide-based solid electrolyte is set smaller than that of the active material, a higher discharging capacity is exhibited than in a case where the The present application claims priority on the basis of JP2017-209603 filed on Oct. 30, 2017 in Japan, the content of which is incorporated herein by reference.

EXPLANATION OF REFERENCES

1: negative electrode collector
2: negative electrode active material layer
3: solid electrolyte layer
4: positive electrode active material layer
5: positive electrode collector
6: operation portion
10: all-solid state secondary battery

What is claimed is:
1. A composition for forming an active material layer, the composition comprising:
a sulfide-based solid electrolyte;
an active material;
a conductive auxiliary agent including a carbonaceous material; and
a dispersion medium,
in which, with respect to 100% by mass of solid components of the composition for forming an active material layer, a total content of the sulfide-based solid electrolyte and the active material is 5% to 99.9% by mass; in the case where the active material is a positive electrode active material, a content of the positive electrode active material is 10% to 95% by mass; in the case where the active material is a negative electrode active material, a content of the negative electrode active material is 10% to 80% by mass; and a content of the conductive auxiliary agent is 1% to 3% by mass, wherein the dispersion medium includes at least one ketone compound dispersion medium in which two aliphatic groups each having 4 or more carbon atoms are bonded to a carbonyl group.

2. The composition for forming an active material layer according to claim 1, wherein each of the aliphatic groups has a branched chain structure.

3. The composition for forming an active material layer according to claim 1, wherein the dispersion medium includes at least one non-polar dispersion medium.

4. The composition for forming an active material layer according to claim 3, wherein the non-polar dispersion medium is a saturated aliphatic hydrocarbon compound dispersion medium.

5. The composition for forming an active material layer according to claim 1, wherein a median diameter of the active material is larger than a median diameter of the sulfide-based solid electrolyte.

6. A method for manufacturing a composition for forming an active material layer, the method comprising:

a step of preliminarily dispersing a sulfide-based solid electrolyte in a dispersion medium including at least one ketone compound dispersion medium in which two aliphatic groups each having 4 or more carbon atoms are bonded to a carbonyl group; and a step of mixing the obtained preliminary dispersion, an active material, and a conductive auxiliary agent including a carbonaceous material, in which, with mixing ratios, with respect to 100% by mass of solid components of the composition for forming an active material layer, a total content of the sulfide-based solid electrolyte and the active material is 5% to 99.9% by mass; in the case where the active material is a positive electrode active material, a content of the positive electrode active material is 10% to 95% by mass; in the case where the active material is a negative electrode active material, a content of the negative electrode active material is 10% to 80% by mass; and a content of the conductive auxiliary agent is 1% to 3% by mass.

7. The method for manufacturing a composition for forming an active material layer according to claim 6, wherein each of the aliphatic groups has a branched chain structure.

8. The method for manufacturing a composition for forming an active material layer according to claim 6, wherein the dispersion medium includes at least one non-polar dispersion medium.

9. The method for manufacturing a composition for forming an active material layer according to claim 8, wherein the non-polar dispersion medium is a saturated aliphatic hydrocarbon compound dispersion medium.

10. A method for manufacturing an electrode sheet for an all-solid state secondary battery, the method comprising:

manufacturing an electrode sheet for an all-solid state secondary battery through the method for manufacturing a composition for forming an active material layer according to claim 6.

11. A method for manufacturing an all-solid state secondary battery, the method comprising:

manufacturing an all-solid state secondary battery through the method for manufacturing a composition for forming an active material layer according to claim 6.

12. The composition for forming an active material layer according to claim 1, wherein the ketone compound dispersion medium is selected from a group consisting of di (sec-butyl) ketone, di (t-butyl) ketone and di (isopentyl) ketone.

13. The composition for forming an active material layer according to claim 1, wherein the dispersion medium includes at least one non-polar dispersion medium, and a content of the ketone compound dispersion medium in the dispersion medium is 1% by mass to 10% by mass.

14. The method for manufacturing a composition for forming an active material layer according to claim 6, wherein the ketone compound dispersion medium is selected from a group consisting of di (sec-butyl) ketone, di (t-butyl) ketone and di (isopentyl) ketone.

15. The method for manufacturing a composition for forming an active material layer according to claim 6, wherein the dispersion medium includes at least one non-polar dispersion medium, and a content of the ketone compound dispersion medium in the dispersion medium is 1% by mass to 10% by mass.

* * * * *